United States Patent
Yoshida

(10) Patent No.: US 10,866,409 B2
(45) Date of Patent: *Dec. 15, 2020

(54) LIGHT DEFLECTING DEVICE, OPTICAL SCANNING DEVICE AND IMAGE FORMING APPARATUS

(71) Applicant: KYOCERA Document Solutions Inc., Osaka (JP)

(72) Inventor: Shingo Yoshida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,596

(22) Filed: Aug. 15, 2019

(65) Prior Publication Data

US 2020/0057300 A1 Feb. 20, 2020

(30) Foreign Application Priority Data

Aug. 17, 2018 (JP) ................... 2018-153405

(51) Int. Cl.
*G02B 7/182* (2006.01)
*G02B 26/12* (2006.01)
*G03G 15/04* (2006.01)

(52) U.S. Cl.
CPC ........... *G02B 26/12* (2013.01); *G02B 7/1821* (2013.01); *G02B 26/121* (2013.01); *G03G 15/04036* (2013.01)

(58) Field of Classification Search
CPC .... G02B 7/1821; G02B 26/12; G02B 26/121; G02B 26/124; G03G 15/04036
See application file for complete search history.

(56) References Cited

U.S. PATENT DOCUMENTS

2004/0104994 A1* 6/2004 Ishihara ............... G02B 26/125
                                                      347/258
2013/0222863 A1* 8/2013 Yoshida ............... G02B 26/124
                                                      358/474
(Continued)

FOREIGN PATENT DOCUMENTS

| JP | 6-95021 | 4/1994 |
| JP | 6-308416 | 11/1994 |
| JP | 2017-191257 | 10/2017 |

OTHER PUBLICATIONS

Extended European Search Report dated Jan. 16, 2020 in corresponding European Patent Application No. 19191680.8.

*Primary Examiner* — Anh T Vo
(74) *Attorney, Agent, or Firm* — Wenderoth, Lind & Ponack, L.L.P.

(57) ABSTRACT

A light deflecting device includes a rotary polyhedron and a cover that covers the rotary polyhedron. The cover includes an opening facing a peripheral surface of the rotary polyhedron. Light beam is irradiated to the peripheral surface of the rotary polyhedron through the opening of the cover, and the rotary polyhedron allows the light beam to be deflected and scanned with respect to an object to be irradiated while rotating about an axial center thereof. When an opening angle of the opening centered on the axial center of the rotary polyhedron is $\theta$ and n is set as a natural number, $\theta$ satisfies the following Equation (1) $\theta > ((360°/\text{the number of surfaces of the rotary polyhedron}) \times n) \times 0.83 \ldots$ (1) and Equation (2) $\theta < ((360°/\text{the number of surfaces of the rotary polyhedron}) \times n) \times 1.17 \ldots$ (2).

18 Claims, 22 Drawing Sheets

(56) References Cited

U.S. PATENT DOCUMENTS

| | | | |
|---|---|---|---|
| 2014/0211288 A1* | 7/2014 | Ohta | G03G 15/043 |
| | | | 359/205.1 |
| 2017/0299975 A1 | 10/2017 | Mizutani et al. | |
| 2018/0113396 A1* | 4/2018 | Fukuhara | G03G 21/1633 |
| 2020/0166864 A1* | 5/2020 | Yoshida | G03G 15/04036 |

* cited by examiner

LIGHT DEFLECTING DEVICE, OPTICAL SCANNING DEVICE AND IMAGE FORMING APPARATUS

CROSS-REFERENCE TO RELATED APPLICATION

This application is based upon and claims the benefit of priority from Japanese Patent Application No. 2018-153405 filed on Aug. 17, 2018, the entire contents of which are incorporated herein by reference.

BACKGROUND

The technology of the present disclosure relates to a light deflecting device, an optical scanning device and an image forming apparatus.

In general, a light deflecting device, is provided in an image forming apparatus, for example. The light deflecting device includes a rotary polyhedron and a cover that covers the rotary polyhedron, and the cover is formed with an opening facing a peripheral surface of the rotary polyhedron. Light emitted from a light source is irradiated to the peripheral surface of the rotary polyhedron through the opening of the cover, and the rotary polyhedron allows the light to be deflected and scanned with respect to an image carrying member as an object to be irradiated through the opening while rotating about an axial center thereof. In this way, an electrostatic latent image is formed on a surface of the image carrying member.

Since the cover of this type of light deflecting device is a non-sealed type cover formed with the opening, noise generated by the rotation of the rotary polyhedron leaks out of the cover from the opening. In this regard, in the related art, the noise is reduced by forming the opening as small as possible.

SUMMARY

A light deflecting device of an aspect of the present disclosure includes a rotary polyhedron and a cover that covers the rotary polyhedron. The cover includes an opening facing a peripheral surface of the rotary polyhedron. Light beam emitted from a light source is irradiated to the peripheral surface of the rotary polyhedron through the opening of the cover. The rotary polyhedron allows the light beam to be deflected and scanned with respect to an object to be irradiated through the opening while rotating about an axial center thereof.

In the light deflecting device, when an opening angle of the opening centered on the axial center of the rotary polyhedron is θ and n is set as a natural number smaller than a number of surfaces of the rotary polyhedron, θ satisfies Equation (1) θ>((360°/the number of surfaces of the rotary polyhedron)×n)×0.83 . . . (1) and Equation (2) θ<((360°/the number of surfaces of the rotary polyhedron)×n)×1.17 . . . (2).

A light deflecting device of another aspect of the present disclosure includes a rotary polyhedron and a cover that covers the rotary polyhedron. The cover includes an opening facing a peripheral surface of the rotary polyhedron. Light beam emitted from a light source is irradiated to the peripheral surface of the rotary polyhedron through the opening of the cover. The rotary polyhedron allows the light beam to be deflected and scanned with respect to an object to be irradiated through the opening while rotating about an axial center thereof.

In the light deflecting device, when an opening angle of the opening centered on the axial center of the rotary polyhedron is θ and n is set as a natural number smaller than a number of surfaces of the rotary polyhedron, θ satisfies Equation (3) θ≈(360°/the number of surfaces of the polygon mirror 63)×n.

An optical scanning device of another aspect of the present disclosure includes the light deflecting device and the light source.

An image forming apparatus of another aspect of the present disclosure includes the optical scanning device and the object to be irradiated. The object to be irradiated is a an image carrying member having a surface on which an electrostatic latent image is formed.

DETAILED DESCRIPTION

Hereinafter, an example of an embodiment will be described on the basis of the drawings.

Figure 1:
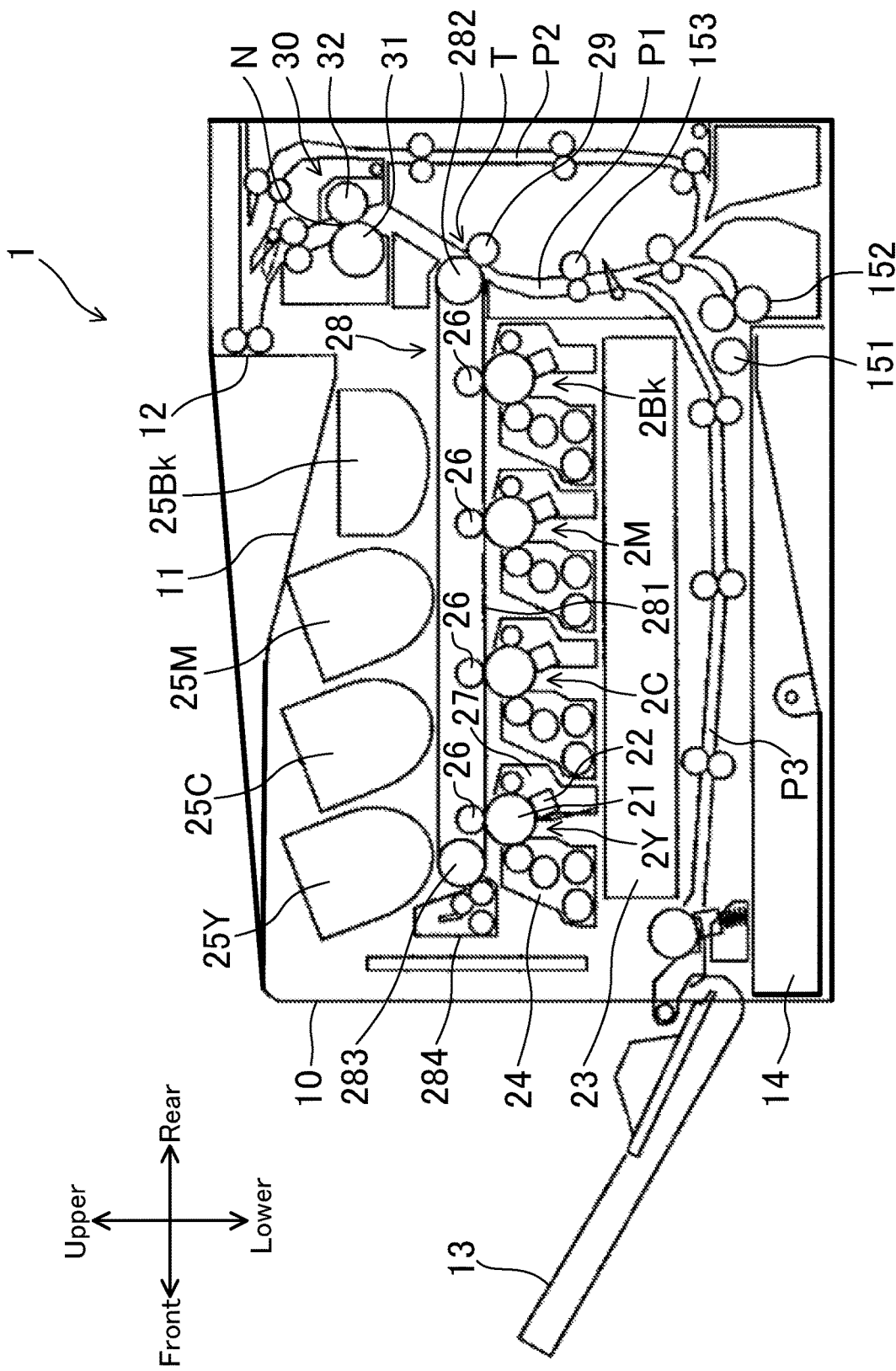
FIG. 1 is a sectional view illustrating a schematic configuration of an image forming apparatus.

FIG. 1 illustrates an image forming apparatus 1. The image forming apparatus 1 is a tandem type color printer (the image forming apparatus 1 may be a copy machine or a multifunctional peripheral). The image forming apparatus 1 has an approximately rectangular parallelepiped body housing 10.

[Structure of Image Forming Apparatus 1]

The body housing 10 receives a plurality of processing units for performing image forming processing on a sheet therein. In the present embodiment, the processing units include image forming units 2Y, 2C, 2M, and 2Bk, an optical scanning device 23, an intermediate transfer unit 28, and a fixing device 30.

The body housing 10 is provided on the upper surface thereof with a sheet discharge tray 11. A sheet discharge port 12 is opened in opposition to the sheet discharge tray 11. A manual sheet feeding tray 13 is attached to a sidewall of the body housing 10 so as to be freely openable and closable. A sheet feeing cassette 14 is detachably mounted at a lower part of the body housing 10.

The image forming units 2Y, 2C, 2M, and 2Bk form toner images of yellow (Y), cyan (C), magenta (M), and black (Bk) on the basis of image information transmitted from an external device. The image forming units 2Y, 2C, 2M, and 2Bk are arranged in tandem at predetermined intervals in a horizontal direction.

Each of the image forming units 2Y, 2C, 2M, and 2Bk includes the following parts and devices, that is, a cylindrical body-shaped photosensitive drum 21 (corresponding to an image carrying member and an object to be irradiated) for carrying an electrostatic latent image and a toner image, a charging unit 22 for charging a drum peripheral surface of the photosensitive drum 21, a developing device 24 for forming the toner image by attaching a developer to the electrostatic latent image, a primary transfer roller 26 for primarily transferring the toner image formed on the photosensitive drum 21, and a cleaning device 27 for removing residual toner on the drum peripheral surface of the photosensitive drum 21, and the image forming units 2Y, 2C, 2M, and 2Bk include toner containers 25Y, 25C, 25M, and 25Bk of yellow, cyan, magenta, and black for supplying toner of each color to the developing device 24, respectively.

In the following description, when the photosensitive drum 21 provided in each of the image forming units 2Y, 2C, 2M, and 2Bk is particularly described, the photosensitive drum provided in the image forming unit 2Y is referred to as a "first photosensitive drum 21Y". Furthermore, the photosensitive drum provided in the image forming unit 2C is referred to as a "second photosensitive drum 21C". The photosensitive drum provided in the image forming unit 2M is referred to as a "third photosensitive drum 21M", and the photosensitive drum provided in the image forming unit 2Bk is referred to as a "fourth photosensitive drum 21Bk".

The optical scanning device 23 forms the electrostatic latent image on the drum peripheral surface of the photosensitive drum 21 of each color. The optical scanning device 23 includes an incident optical system having a plurality of light sources prepared for each color, a light deflecting device 6 (see FIG. 2 and FIG. 3) that deflects light beam emitted from the light sources, and an image forming optical system that forms an image of the light beam deflected by the light deflecting device 6 on the drum peripheral surface of the photosensitive drum 21 of each color and allows the light beam to be scanned on the drum peripheral surface of the photosensitive drum 21 of each color. The optical scanning device 23 will be described in detail below.

The intermediate transfer unit 28 primarily transfers the toner image formed on the photosensitive drum 21. The intermediate transfer unit 28 includes a transfer belt 281 that rotates in contact with the drum peripheral surface of each photosensitive drum 21, and a driving roller 282 and a driven roller 283 over which the transfer belt 281 is stretched. The transfer belt 281 is pressed to the drum peripheral surface of each photosensitive drum 21 by the primary transfer roller 26. The toner image on the photosensitive drum 21 of each color is superimposed on the same place of the transfer belt 281 and is primarily transferred. In this way, a full-color toner image is formed on the transfer belt 281.

A secondary transfer roller 29 is arranged to face the driving roller 282 and forms a secondary transfer nip part T with the transfer belt 281 interposed therebetween. The full-color toner image of the transfer belt 281 is secondarily transferred to a sheet at the secondary transfer nip part T. Toner remaining on the peripheral surface of the transfer belt 281 is collected by a belt cleaning device 284 arranged to face the driven roller 283.

The fixing device 30 includes a fixing roller 31 having a heat source incorporated therein and a pressure roller 32 that forms a fixing nip part N together with the fixing roller 31. The fixing device 30 heats and presses the sheet, on which the toner image has been transferred at the secondary transfer nip part T, at the fixing nip part N, thereby allowing toner to be welded to the sheet. The sheet subjected to the fixing process is discharged from the sheet discharge port 12 to the sheet discharge tray 11.

The body housing 10 is provided therein with the sheet conveyance path for conveying a sheet. The sheet conveyance path includes a main conveyance path P1 extending in a vertical direction through the secondary transfer nip part T and the fixing device 30 from the vicinity of a lower part of the body housing 10 to the vicinity of an upper part thereof. A downstream end of the main conveyance path P1 is connected to the sheet discharge port 12. A reverse conveyance path P2 for conveying a sheet in a reverse direction during duplex printing extends from the lowermost stream end to the vicinity of an upstream end of the main conveyance path P1. Furthermore, a manual sheet conveyance path P3 from the manual sheet feeding tray 13 to the main conveyance path P1 is arranged above the sheet feeing cassette 14.

The sheet feeing cassette 14 receives a bundle of sheets. On the rear upper side of the sheet feeing cassette 14, a pick-up roller 151 for delivering sheets of the uppermost layer of the bundle of the sheets one by one and a sheet feeding roller pair 152 for sending the sheets to the upstream end of the main conveyance path P1 are provided.

Sheets placed on the manual sheet feeding tray 13 are sent to the upstream end of the main conveyance path P1 through the manual sheet conveyance path P3. On an upstream side from the secondary transfer nip part T of the main conveyance path P1, a resist roller pair 153 is arranged to send the sheets to the transfer nip part.

When the sheet is subjected to one side printing (image formation), the sheet is sent to the main conveyance path P1 from the sheet feeing cassette 14 or the manual sheet feeding tray 13. Then, the toner image is transferred to the sheet at the secondary transfer nip part T. Furthermore, toner is fixed to the sheet by the fixing device 30. The sheet with the toner fixed thereto is discharged from the sheet discharge port 12 to the sheet discharge tray 11.

When the sheet is subjected to duplex printing, the aforementioned transfer process and fixing process are performed on one side of the sheet and then the sheet is subjected to switchback conveyance. Then, the sheet is returned to the vicinity of the upstream end of the main conveyance path P1 through the reverse conveyance path P2. Thereafter, the transfer process and the fixing process are performed on the other side of the sheet. The sheet subjected to the fixing process is discharged from the sheet discharge port 12 to the sheet discharge tray 11.

[Structure of Optical Scanning Device 23]

Next, the optical scanning device 23 will be described in detail. In the following description, with reference to FIG. 4, a longitudinal direction in which a board 61 provided in the light deflecting device 6 extends is referred to as a "first direction A1", and a direction perpendicular to one main surface of the board 61 is referred to as a "second direction A2". Furthermore, a direction intersecting with the first direction A1 and perpendicular to the second direction A2 is referred to as a "third direction A3", and a direction perpendicular to both directions of the second direction A2 and the third direction A3 is referred to as a "fourth direction A4".

The optical scanning device 23 is horizontally arranged below the image forming units 2Y, 2C, 2M, and 2Bk and the intermediate transfer unit 28. In the optical scanning device 23, the second direction A2 coincides with the vertical direction. The third direction A3 coincides with a front and rear direction corresponding to the movement direction of the transfer belt 281 that rotates, and the fourth direction A4 coincides with a right and left direction corresponding to a rotation axis direction (axial center direction) of the photosensitive drum 21.

The first direction A1 is a direction intersecting with the third direction A3 and the fourth direction A4 at an approximately 45°. In the second direction A2 coinciding with the vertical direction, an upper side in the vertical direction is referred to as "one side" and a lower side in the vertical direction is referred to as "the other side".

In the third direction A3 coinciding with the front and rear direction, a front side in the front and rear direction is referred to as "one side" and a rear side in the front and rear direction is referred to as "the other side". In the fourth direction A4 coinciding with the right and left direction, a right side in the right and left direction is referred to as "one side" and a left side in the right and left direction is referred to as "the other side".

Figure 2:
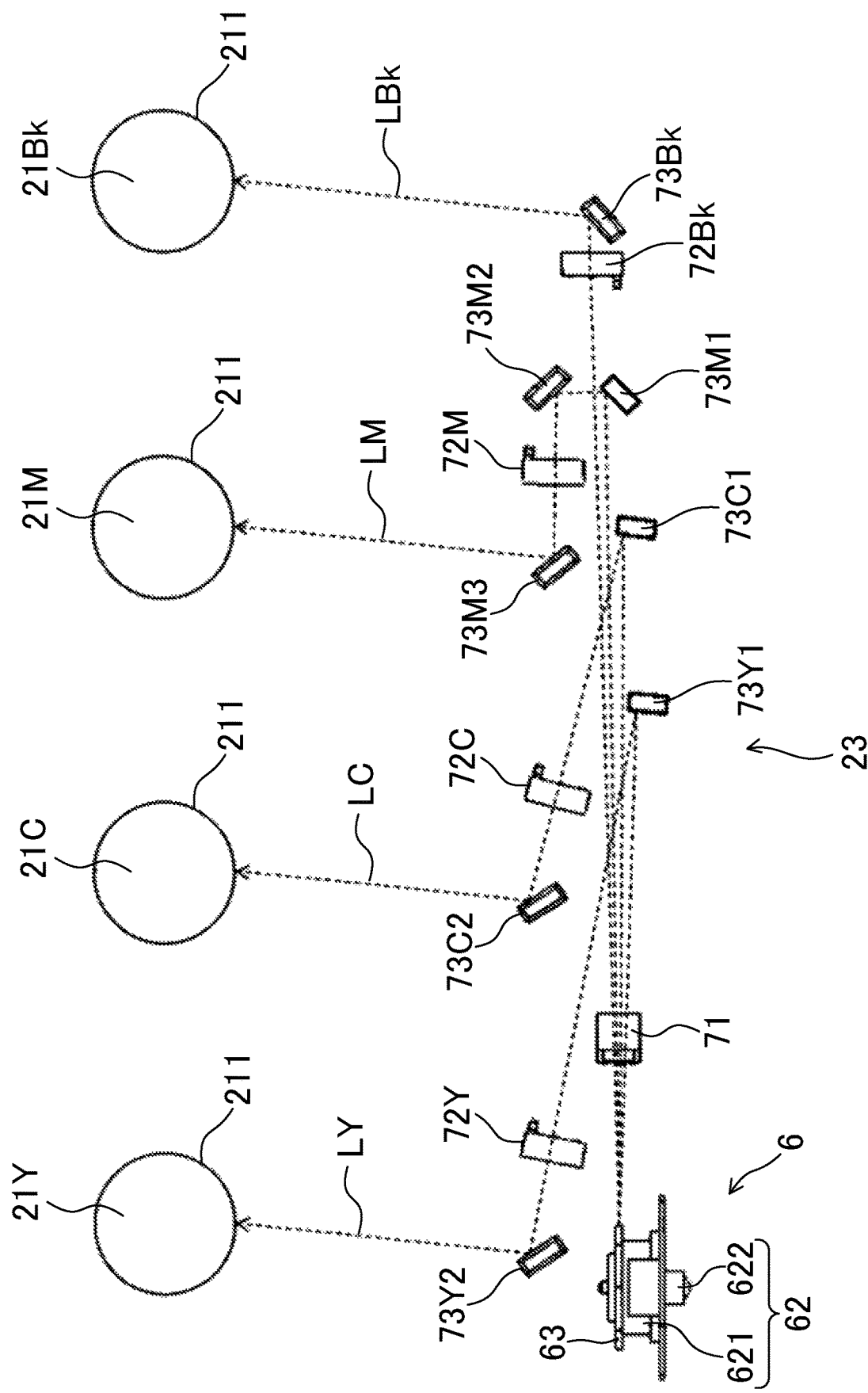
FIG. 2 is an optical path diagram illustrating a configuration of a sub-scanning section (a surface corresponding to a section including an optical axis of an optical system and a sub-scanning direction) of an optical scanning device.

As illustrated in FIG. 2, the optical scanning device 23 scans the drum peripheral surface 211 of the first photosensitive drum 21Y for yellow by yellow light beam LY. Similarly, the optical scanning device 23 scans the drum peripheral surfaces 211 of the second photosensitive drum 21C for cyan, the third photosensitive drum 21M for magenta, and the fourth photosensitive drum 21Bk for black by cyan light beam LC, magenta light beam LM, and black light beam LBk, respectively.

The yellow light beam LY is laser light beam for yellow image drawing and the cyan light beam LC is laser light beam for cyan image drawing. The magenta light beam LM is laser light beam for magenta image drawing and the black light beam LBk is laser light beam for black image drawing.

Figure 3:
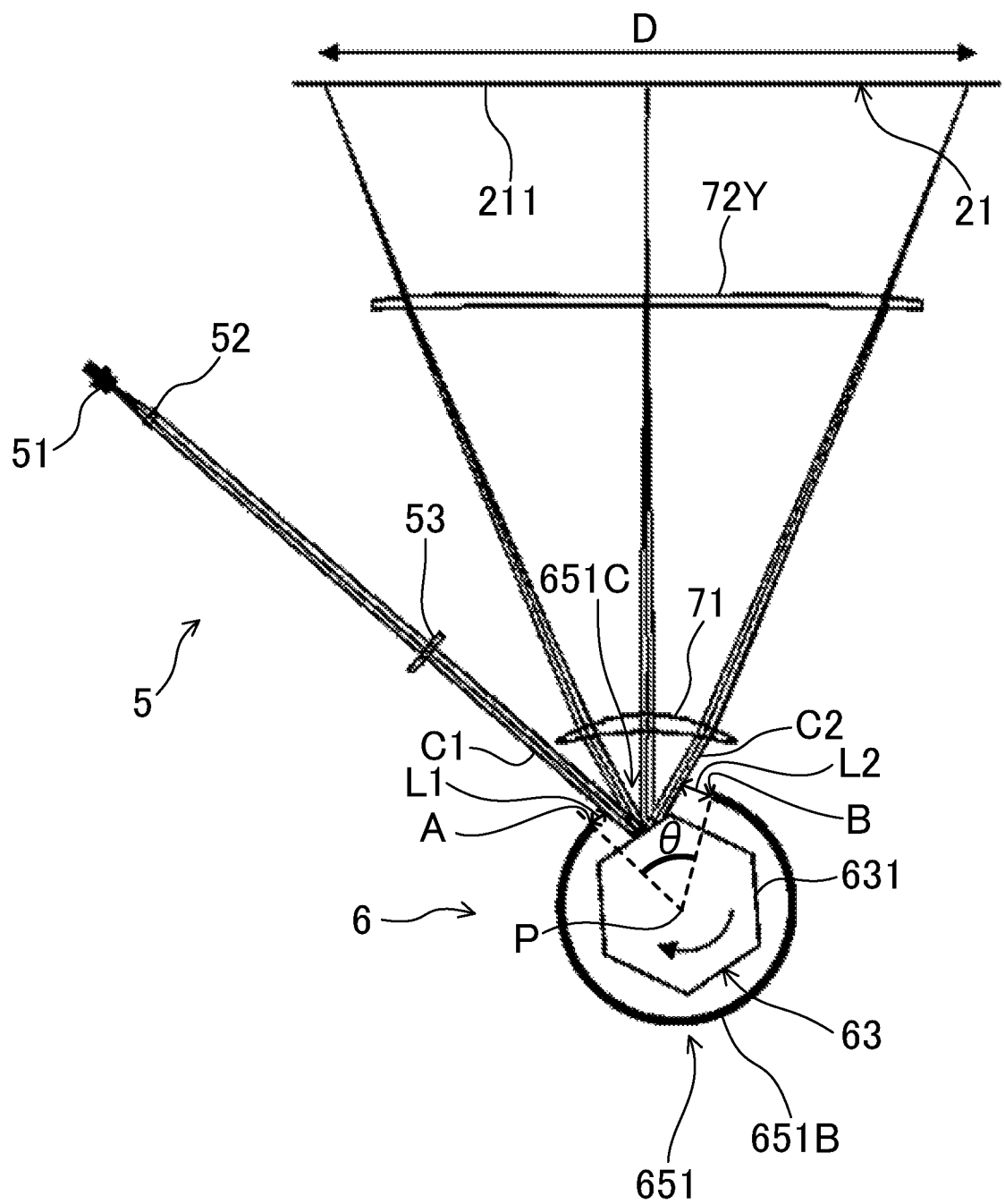
FIG. 3 is an optical path diagram illustrating a configuration of a main scanning section (a surface corresponding to a section perpendicular to a sub-scanning direction) of an optical scanning device.

As illustrated in FIG. 2 and FIG. 3, the optical scanning device 23 includes an incident optical system 5 arranged in the optical path of each color light beam, one light deflecting device 6 shared by four colors, a first scanning lens 71, and second scanning lenses 72Y, 72C, 72M, and 72Bk. Moreover, the optical scanning device 23 includes reflective mirrors 73Y1 and 73Y2 for yellow, reflective mirrors 73C1 and 73C2 for cyan, reflective mirrors 73M1, 73M2 and 73M3 for magenta, and a reflective mirror 73Bk for black. These are received in an optical housing 4.

The reflective mirrors 73Y1 and 73Y2 for yellow reflect the yellow light beam LY, and the reflective mirrors 73C1 and 73C2 for cyan reflect the cyan light beam LC. The reflective mirrors 73M1, 73M2 and 73M3 for magenta reflect the magenta light beam LM, and the reflective mirror 73Bk for black reflects the black light beam LBk.

The first scanning lens 71, the second scanning lenses 72Y, 72C, 72M, and 72Bk, the reflective mirrors 73Y1 and 73Y2 for yellow, the reflective mirrors 73C1 and 73C2 for cyan, the reflective mirrors 73M1, 73M2 and 73M3 for magenta, and the reflective mirror 73Bk for black constitute an image forming optical system.

The optical housing 4 has a light deflecting device receiving part 41 (see FIG. 4) serving as a region for receiving the light deflecting device 6. The light deflecting device receiving part 41 has a placing surface 411 on which the light deflecting device 6 is placed.

The incident optical system 5 is received in the optical housing 4 and is an optical system for allowing each color light beam to be incident on a deflection surface 631 which is a peripheral surface of a polygon mirror 63 (corresponding to a rotary polyhedron) to be described below. As illustrated in FIG. 3, the incident optical system 5 includes a light source 51, a collimator lens 52, and a cylindrical lens 53.

The light source 51 is composed of a laser element and emits light beam to be irradiated to the deflection surface 631 of the polygon mirror 63. The collimator lens 52 converts the light beam diffused after being emitted from the light source 51 into parallel light. The cylindrical lens 53 converts the parallel light from the collimator lens 52 into linear light long in the fourth direction A4 and forms an image of the linear light on the deflection surface 631 of the polygon mirror 63.

As described above, the fourth direction A4 is a direction coinciding with the right and left direction corresponding to the rotation axis direction of the photosensitive drum 21 and coincides with the main scanning direction of scanning with respect to the photosensitive drum 21 by the optical scanning device 23.

The first scanning lens 71 is a lens having distortion aberration (fθ characteristic) in which an angle of incident light beam is proportional to an image height and is a long lens extending along the fourth direction A4 (main scanning direction). The first scanning lens 71 collects light beam reflected by the deflection surface 631 of the polygon mirror 63.

Similarly to the first scanning lens 71, the second scanning lens 72Y is a lens having the distortion aberration (fθ characteristic) and is a long lens extending along the fourth direction A4 (main scanning direction). The second scanning lenses 72Y collects the yellow light beam LY having passed through the first scanning lens 71 and forms an image of the yellow light beam LY on the drum peripheral surfaces 211 of the first photosensitive drum 21Y.

Similarly to the first scanning lens 71, the second scanning lens 72C is a lens having the distortion aberration (fθ characteristic) and is a long lens extending along the fourth direction A4 (main scanning direction). The second scanning lenses 72C collects the cyan light beam LC having passed through the first scanning lens 71 and forms an image of the cyan light beam LC on the drum peripheral surfaces 211 of the second photosensitive drum 21C.

Similarly to the first scanning lens 71, the second scanning lens 72M is a lens having the distortion aberration (fθ characteristic) and is a long lens extending along the fourth direction A4 (main scanning direction). The second scanning lenses 72M collects the magenta light beam LM having passed through the first scanning lens 71 and forms an image of the magenta light beam LM on the drum peripheral surfaces 211 of the third photosensitive drum 21M.

Similarly to the first scanning lens 71, the second scanning lens 72Bk is a lens having the distortion aberration (fθ characteristic) and is a long lens extending along the fourth direction A4 (main scanning direction). The second scanning lenses 72Bk collects the black light beam LBk having passed through the first scanning lens 71 and forms an image of the black light beam LBk on the drum peripheral surfaces 211 of the fourth photosensitive drum 21Bk.

The reflective mirrors 73Y1 and 73Y2 for yellow reflect the yellow light beam LY on the image forming optical path of the yellow light beam LY having passed through the first scanning lens 71.

The reflective mirrors 73C1 and 73C2 for cyan reflect the cyan light beam LC on the image forming optical path of the cyan light beam LC having passed through the first scanning lens 71.

The reflective mirrors 73M1, 73M2 and 73M3 for magenta reflect the magenta light beam LM on the image forming optical path of the magenta light beam LM having passed through the first scanning lens 71.

As illustrated in FIG. 2 and FIG. 3, the yellow light beam LY reflected by the deflection surface 631 of the polygon mirror 63 is collected by the first scanning lens 71. Then, the yellow light beam LY is reflected by the reflective mirror 73Y1 for yellow and passes through the second scanning lens 72Y. Thereafter, the yellow light beam LY is reflected by the reflective mirror 73Y2 for yellow and the image of the yellow light beam LY is formed on the drum peripheral surfaces 211 of the first photosensitive drum 21Y.

The cyan light beam LC reflected by the deflection surface 631 of the polygon mirror 63 is collected by the first scanning lens 71. Then, the cyan light beam LC is reflected by the reflective mirror 73C1 for cyan and passes through the second scanning lens 72C. Thereafter, the cyan light beam LC is reflected by the reflective mirror 73C2 for cyan and the image of the cyan light beam LC is formed on the drum peripheral surfaces 211 of the second photosensitive drum 21C.

The magenta light beam LM reflected by the deflection surface 631 of the polygon mirror 63 is collected by the first scanning lens 71. Then, the magenta light beam LM is reflected by the reflective mirrors 73M1 and 73M2 for magenta and passes through the second scanning lens 72M. Thereafter, the magenta light beam LM is reflected by the reflective mirror 73M3 for magenta and the image of the magenta light beam LM is formed on the drum peripheral surfaces 211 of the third photosensitive drum 21M.

The black light beam LBk reflected by the deflection surface 631 of the polygon mirror 63 is collected by the first scanning lens 71 and the second scanning lens Bk. Thereafter, the black light beam LBk is reflected by the reflective mirror 73Bk for black and the image of the black light beam LBk is formed on the drum peripheral surfaces 211 of the fourth photosensitive drum 21Bk.

<Structure of Light Deflecting Device 6>

Figure 4:
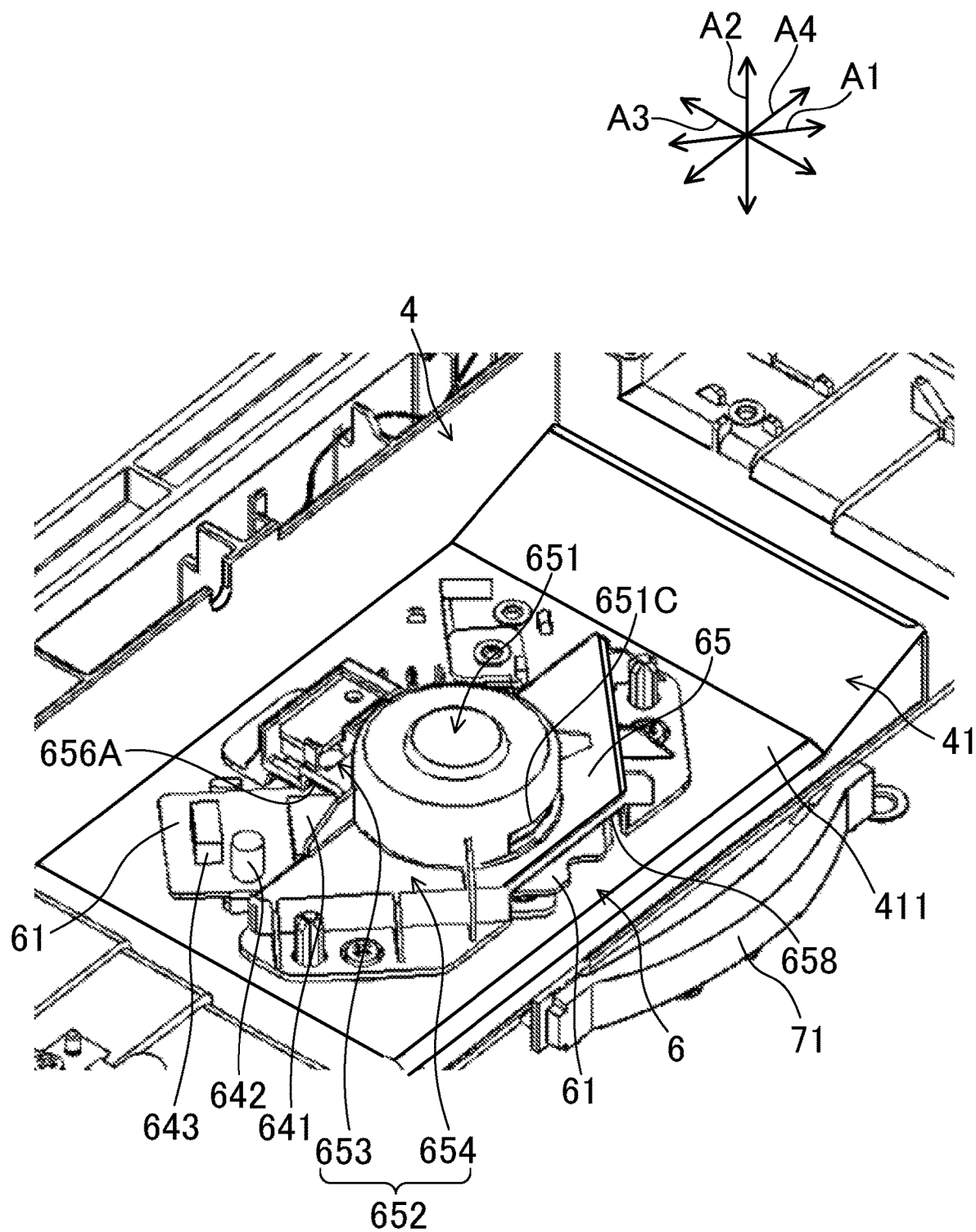
FIG. 4 is a perspective view illustrating a schematic configuration of a light deflecting device.
Figure 5:
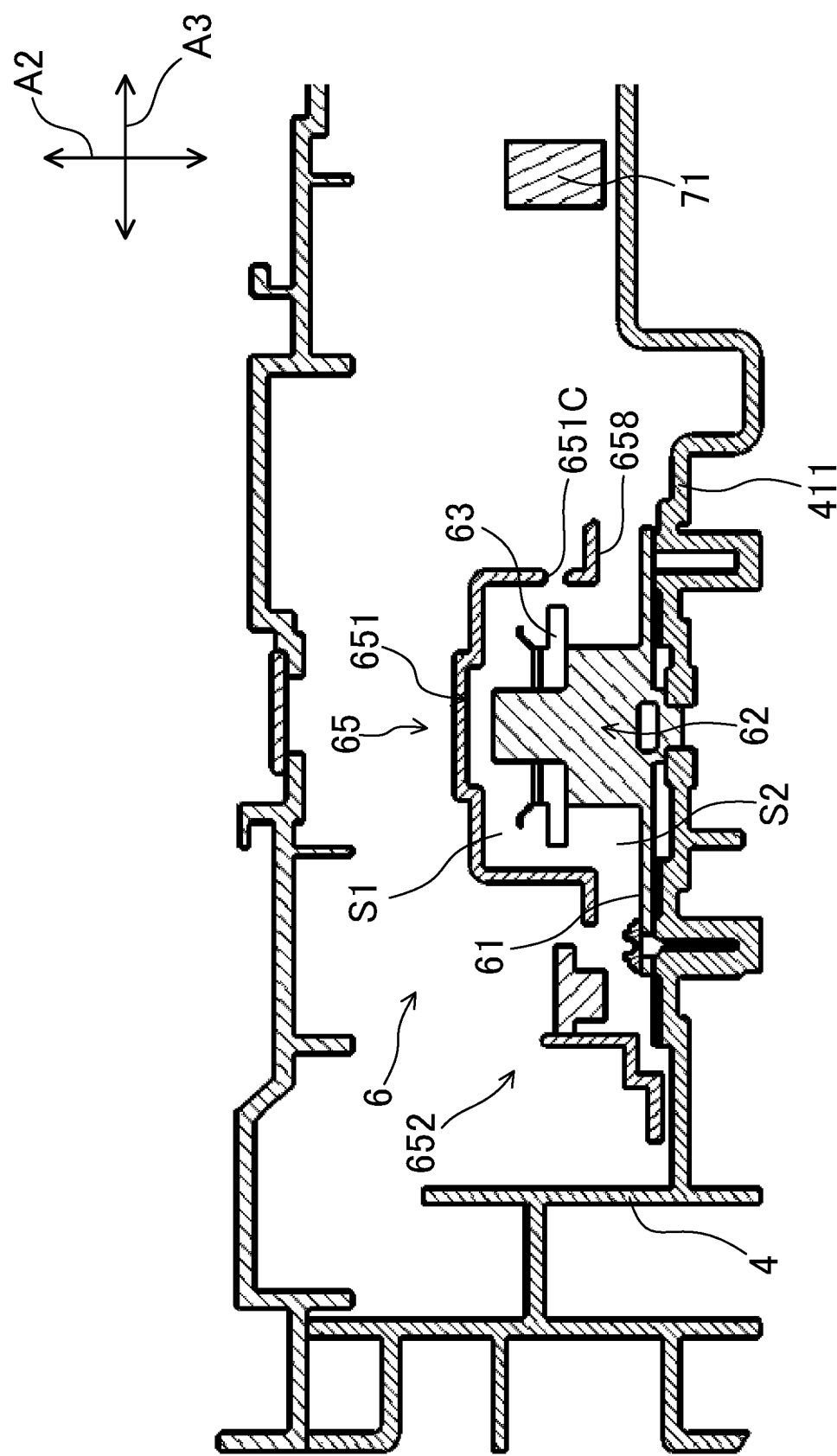
FIG. 5 is a sectional view of a light deflecting device.

As illustrated in FIG. 4 and FIG. 5, the light deflecting device 6 includes the board 61, a driving motor 62 (corresponding to a driving unit), the polygon mirror 63, a driver IC 641, a capacitor 642, a connector 643, and a cover body 65.

[Structure of Board 61]

Figure 6:
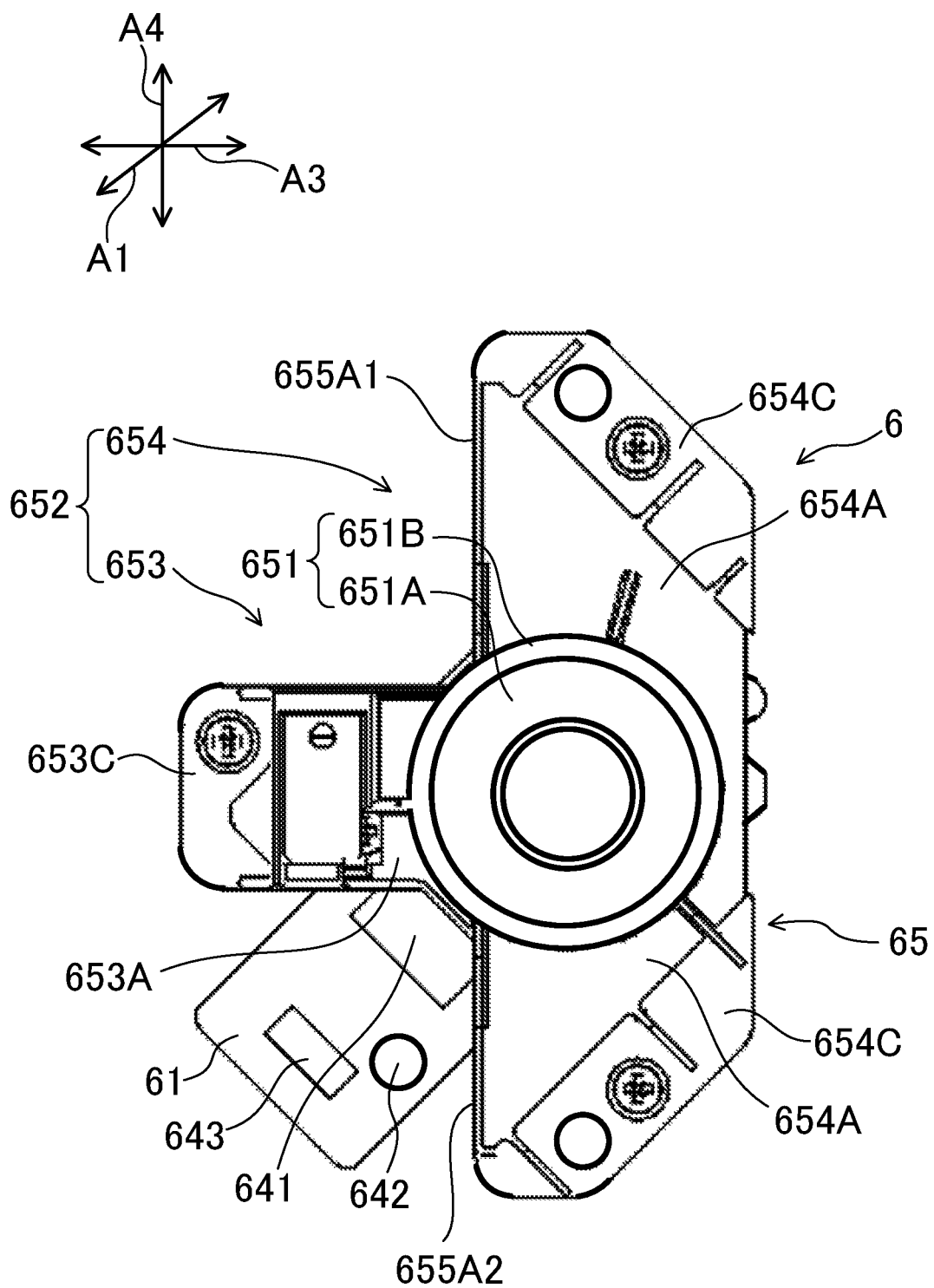
FIG. 6 is a view of a light deflecting device viewed from one side (upper side) in a second direction.

As illustrated in FIG. 4 and FIG. 6, the board 61 is a rectangular plate-shaped circuit board having a predetermined length in the first direction A1. The board 61 is fixed to the placing surface 411 of the light deflecting device receiving part 41 of the optical housing 4.

[Structure of Driving Motor 62]

Figure 7:
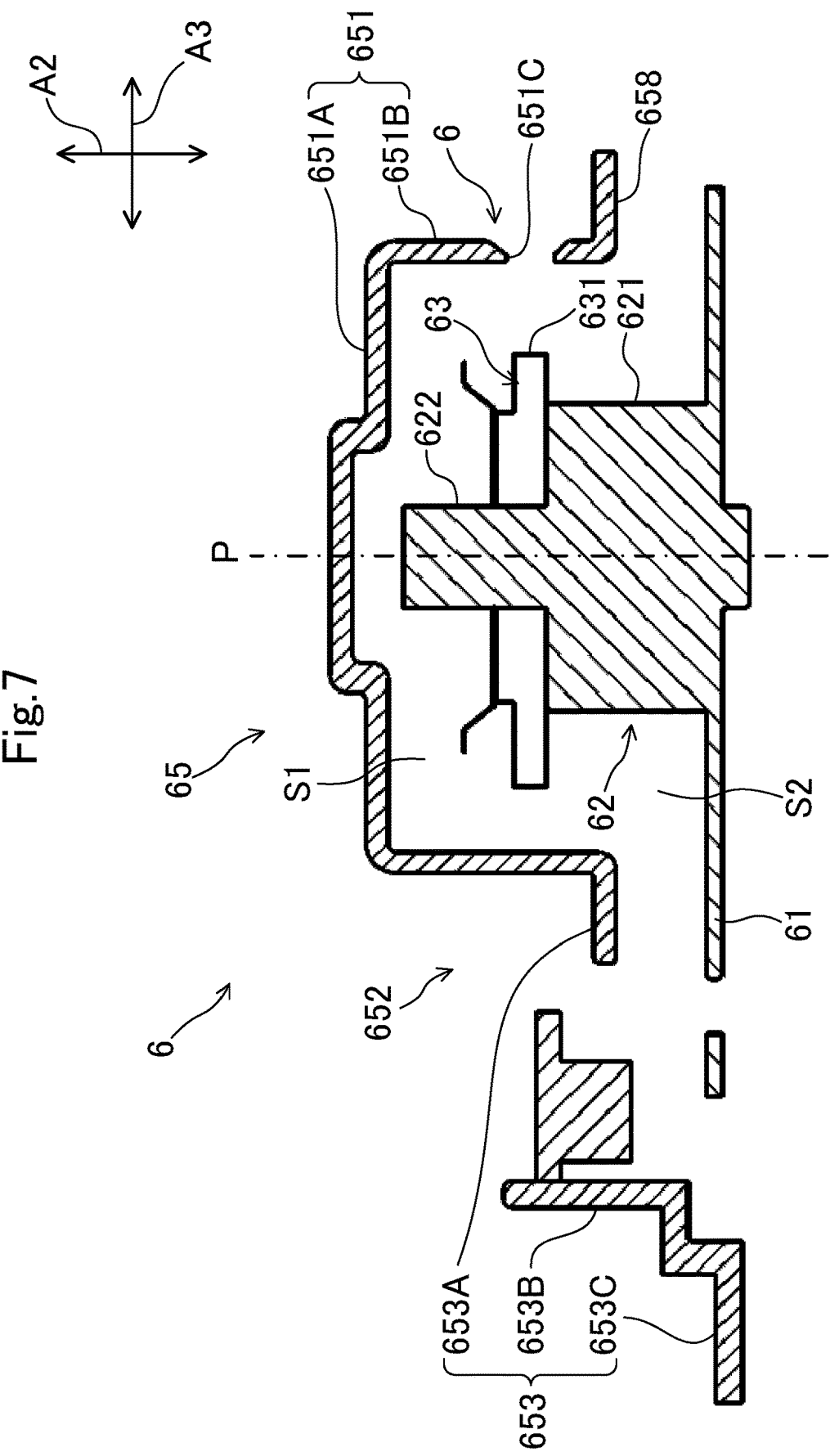
FIG. 7 is a sectional view of a cover body or the like of a light deflecting device.

As illustrated in FIG. 7, the driving motor 62 includes a motor body 621 and a rotating shaft 622 and is fixed to the placing surface 411 to drive and rotate the polygon mirror 63. The rotating shaft 622 protrudes from the motor body 621 and extends in the second direction A2 perpendicular to one main surface of the board 61. When a driving current is inputted to the motor body 621, the rotating shaft 622 rotates and the polygon mirror 63 rotates about an axial center P thereof.

[Structure of Polygon Mirror 63]

Figure 11:
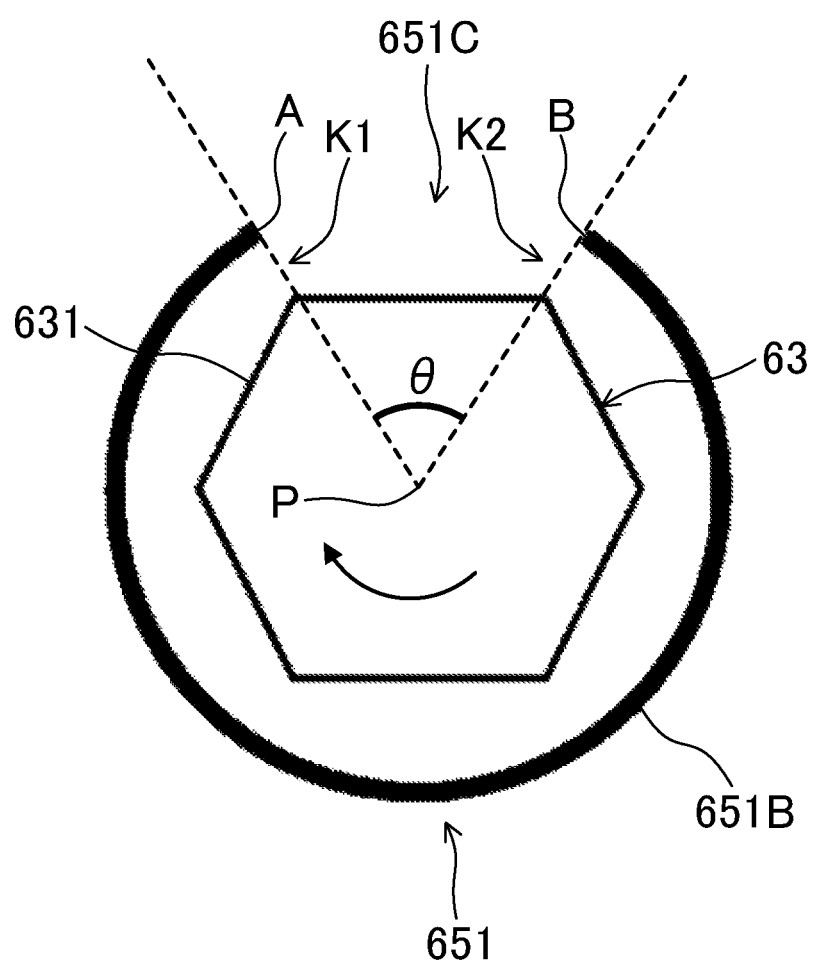
FIG. 11 is a view illustrating a section of a peripheral wall of a first cover part and a polygon mirror.

As illustrated in FIG. 3 and FIG. 7, the polygon mirror 63 is a polygon mirror having a regular hexagonal section. The polygon mirror 63 has six deflection surfaces 631 (corresponding to peripheral surfaces) corresponding to respective sides of the regular hexagon. The light beam emitted from the light source 51 is irradiated to the deflection surfaces 631. The polygon mirror 63 is integrally and rotatably provided at an end of one side (upper side) of the rotating shaft 622 in the second direction A2. The polygon mirror 63 rotates about the axial center P together with the rotation of the rotating shaft 622 and allows the light beam to be deflected and scanned with respect to the drum peripheral surface 211 of the photosensitive drum 21. In FIG. 3, a reference numeral D denotes a scanning region. In FIG. 3 and FIG. 11, the polygon mirror 63 rotates about the axial center P in a clockwise direction.

[Structure of Cover Body 65]

As illustrated in FIG. 4 to FIG. 10, the cover body 65 is fixed to the placing surface 411 of the light deflecting device receiving part 41 of the optical housing 4, and covers the polygon mirror 63 and the driving motor 62. The cover body prevents noise generated by the rotation of the polygon mirror 63 and prevents dust or the like from adhering to the polygon mirror 63. The cover body 65 includes a first cover part 651 and a second cover part 652 (corresponding to cover parts).

[Structure of First Cover Part 651]

As illustrated in FIG. 7, the first cover part 651 covers the polygon mirror 63 from one side (upper side) in the second direction A2 and forms a first space S1 where the polygon mirror 63 is disposed. The first cover part 651 includes a disc-shaped top wall 651A and a cylindrical peripheral wall 651B. The top wall 651A is arranged on one side (upper side) in the second direction A2 in parallel to the placing surface 411 (see FIG. 4). The peripheral wall 651B extends toward the other side (lower side) in the second direction A2 from an outer peripheral edge of the top wall 651A. The peripheral wall 651B and the polygon mirror 63 are positioned concentrically.

Figure 10:
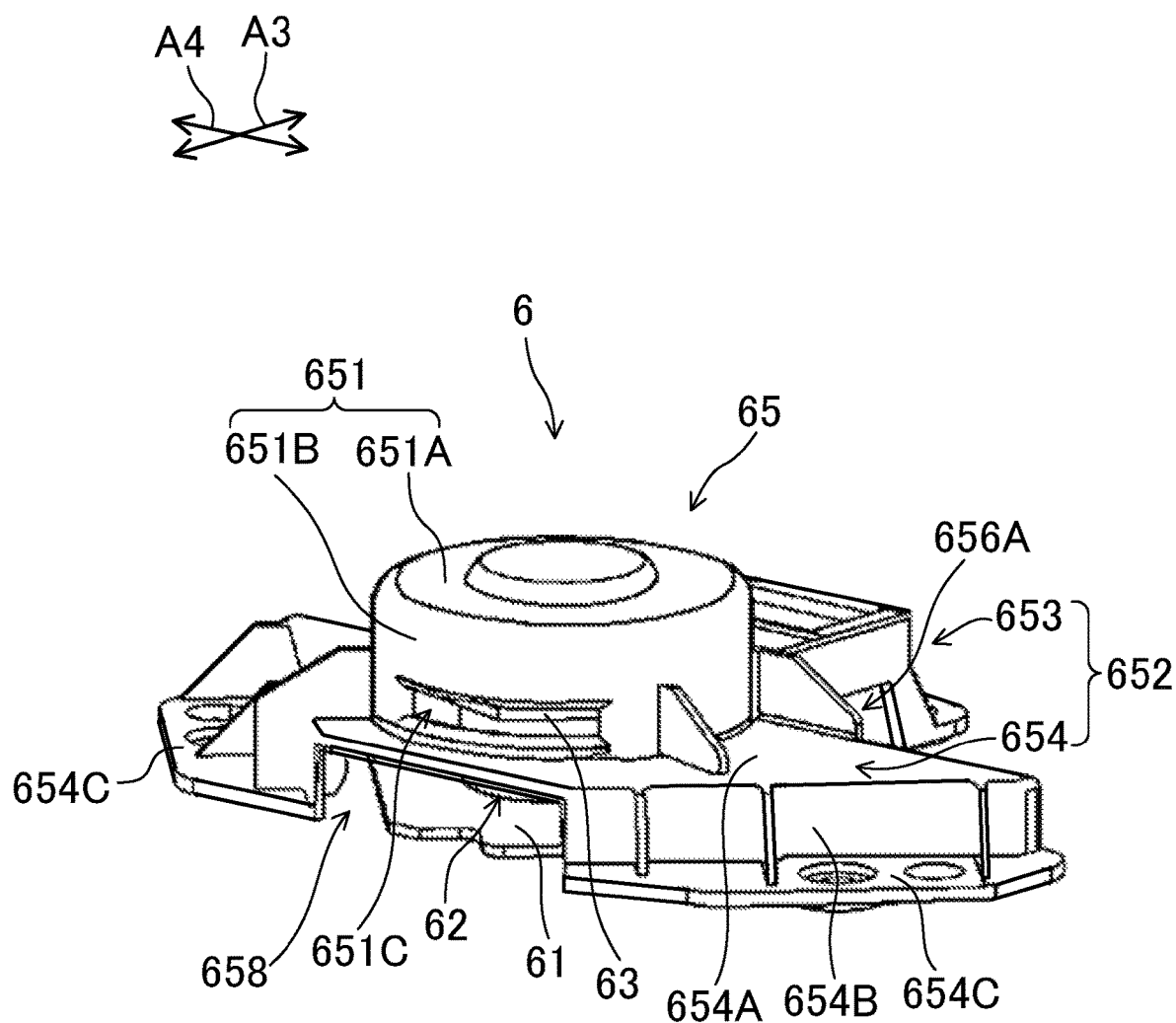
FIG. 10 is a perspective view of a light deflecting device viewed from a rear upper side.

The peripheral wall 651B is formed with a first opening 651C (corresponding to an opening) facing the deflection surface 631 of the polygon mirror 63. As illustrated in FIG. 10 and FIG. 11, the first opening 651C is a long hole along a peripheral direction of the peripheral wall 651B. In FIG. 11, a reference numeral A denotes a first opening end of the first opening 651C on an upstream side in the rotation direction of the polygon mirror 63, and a reference numeral B denotes a second opening end of the first opening 651C on a downstream side in the rotation direction of the polygon mirror 63.

As illustrated in FIG. 3, the first opening 651C guides the light beam emitted from the light source 51 to the inside of the first cover part 651, and guides the light beam deflected by the deflection surfaces 631 of the polygon mirror 63 to the outside of the first cover part 651. The first opening 651C also has a function as an opening that allows airflow generated by the rotation of the polygon mirror 63 to pass therethrough. The first opening 651C will be described in detail below.

[Structure of Second Cover Part 652]

The second cover part 652 forms a second space S2 (see FIG. 7), where the driving motor 62 is disposed, on the other side (lower side) of the first cover part 651 in the second direction A2. The second cover part 652 is connected to the first cover part 651. The second space S2 of the second cover part 652 and the first space S1 of the first cover part 651 communicate with each other. As illustrated in FIG. 4, the second cover part 652 includes a first extending part 653 and a second extending part 654.

[Structure of First Extending Part 653]

Figure 9:
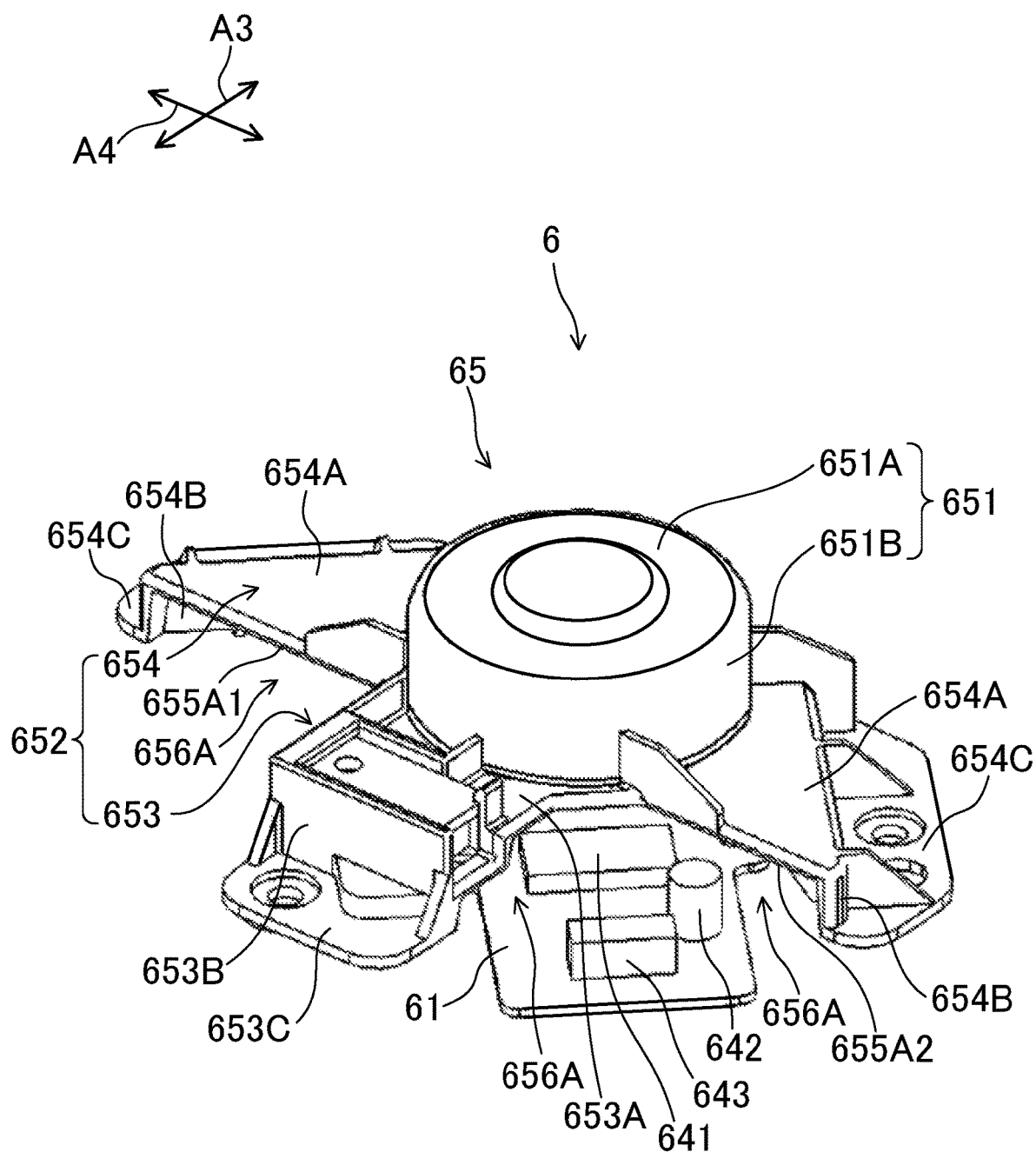
FIG. 9 is a perspective view of a light deflecting device viewed from a front upper side.

As illustrated in FIG. 7 and FIG. 9, the first extending part 653 includes a first upper wall 653A and a first vertical wall 653B. The first upper wall 653A extends from a part of the lower end of the peripheral wall 651B of the first cover part 651 (a part of the peripheral part of the lower end) to one side (front side) in the third direction A3. The first vertical wall 653B extends downward from the front end of the first upper wall 653A. The lower end of the first vertical wall 653B is bent outward to constitute a mounting flange 653C. The mounting flange 653C is fixed to the placing surface 411 (see FIG. 4) of the light deflecting device receiving part 41 of the housing 4.

[Structure of Second Extending Part 654]

As illustrated in FIG. 9, the second extending part 654 includes a second upper wall 654A extending from a remaining part of the lower end of the peripheral wall 651B (a part other than the aforementioned part, that is, the remaining part of the peripheral part of the lower end) to one side (right side) and the other side (left side) in the fourth direction A4.

As illustrated in FIG. 6 and FIG. 9, the second upper wall 654A is formed in a trapezoidal shape that gets narrower on an opposite side (the other side (rear side)) in the third direction A3) of the first extending part 653 when viewed from the second direction A2 (vertical direction). As illustrated in FIG. 10, a second vertical wall 654B extends from a pair of right and left side edges corresponding to oblique sides of the trapezoid to the other side (lower side) in the second direction A2. The lower end of the second vertical wall 654B is bent outward to constitute a mounting flange 654C. The mounting flange 654C is fixed to the placing surface 411 (see FIG. 4) of the light deflecting device receiving part 41 of the housing 4.

As illustrated in FIG. 6 and FIG. 9, since the first upper wall 653A extends from a part of the lower end of the peripheral wall 651B to the one side (front side) in the third direction A3, a front edge of the second upper wall 654A corresponding to a long side of the trapezoid is divided into a front edge part 655A1 on the right side and a front edge part 655A2 on the left side of the peripheral wall 651B. Furthermore, as illustrated in FIG. 9, a lower side of the front edge part 655A1 on the right side of the second upper wall 654A and a lower side of a right side edge of the first upper wall 653A are opened and a lower side of the front edge part 655A2 on the left side of the second upper wall 654A and a lower side of a left side edge of the first upper wall 653A are opened, so that these openings constitute a second opening 656A (corresponding to an air vent port).

Figure 8:
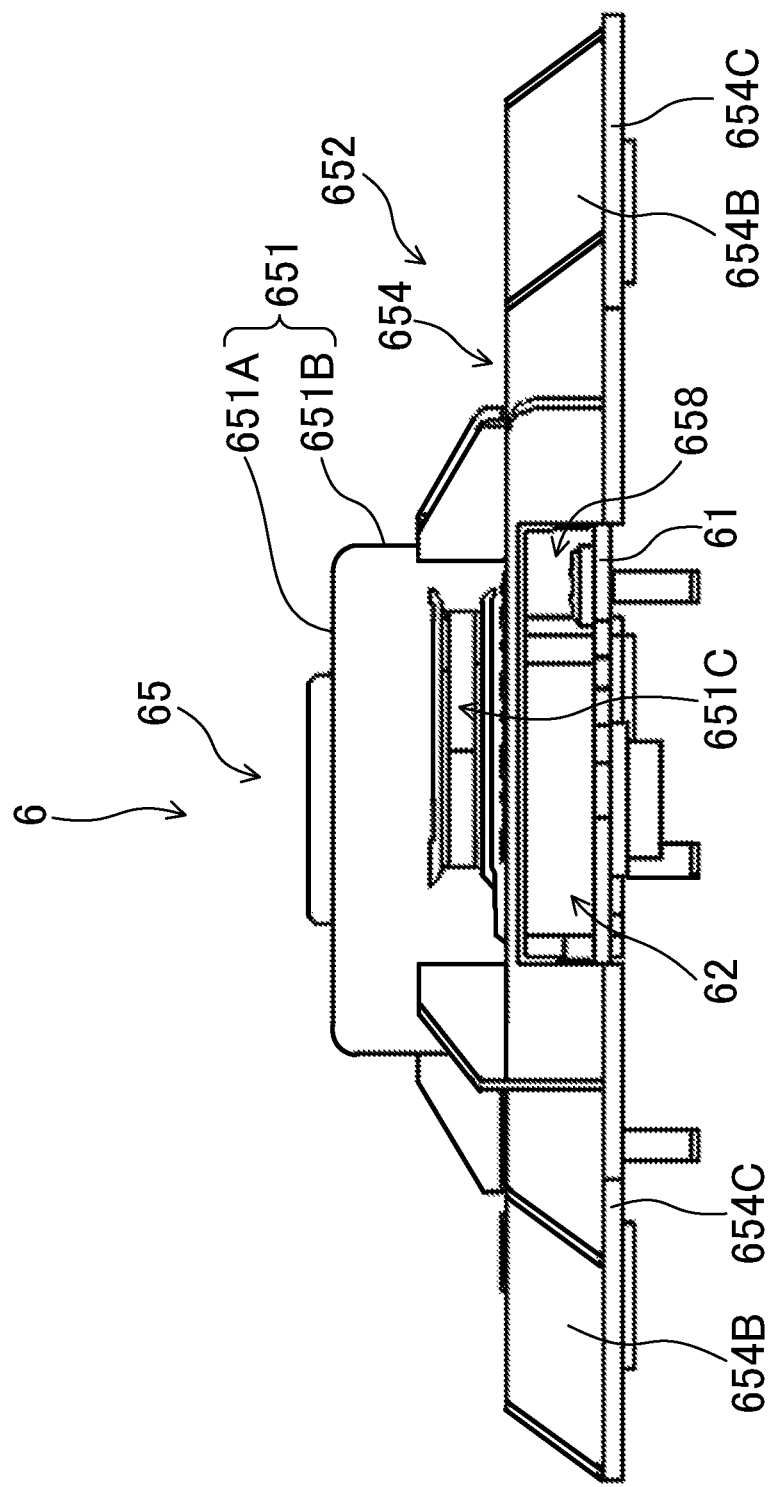
FIG. 8 is a view of a light deflecting device viewed from the other side (rear side) in a third direction.

Furthermore, as illustrated in FIG. 8 and FIG. 10, a lower side of a rear edge of the second upper wall 654A corresponding to a short side of the trapezoid is opened to constitute a third opening 658 (corresponding to an air vent port). The second opening 656A and the third opening 658 have a function of circulating the airflow generated by the rotation of the polygon mirror 63. In this way, it is possible to cool the driving motor 62 that drives the polygon mirror 63 and electronic members around the driving motor 62. As a consequence, it is possible to avoid operation failure due to an increase in the temperature of the driving motor 62 and the electronic members.

[Pressure Variation in Air in First Cover Part 651]

When the polygon mirror 63 rotates, air in the first cover part 651 is pushed in the rotation direction by a corner of the polygon mirror 63. Then, the air in the first cover part 651 is blown out from a first gap K1 (see FIG. 11) between the first opening end A of the first opening 651C and the deflection surface 631 of the polygon mirror 63. Furthermore, air is suck into the first cover part 651 from a second gap K2 (see FIG. 11) between the second opening end B of the first opening 651C and the deflection surface 631 of the polygon mirror 63.

Since the peripheral wall 651B of the first cover part 651 has a circular section and the polygon mirror 63 has a regular hexagonal section, the first gap K1 and the second gap K2 change depending on the rotation of the polygon mirror 63.

Figure 13:
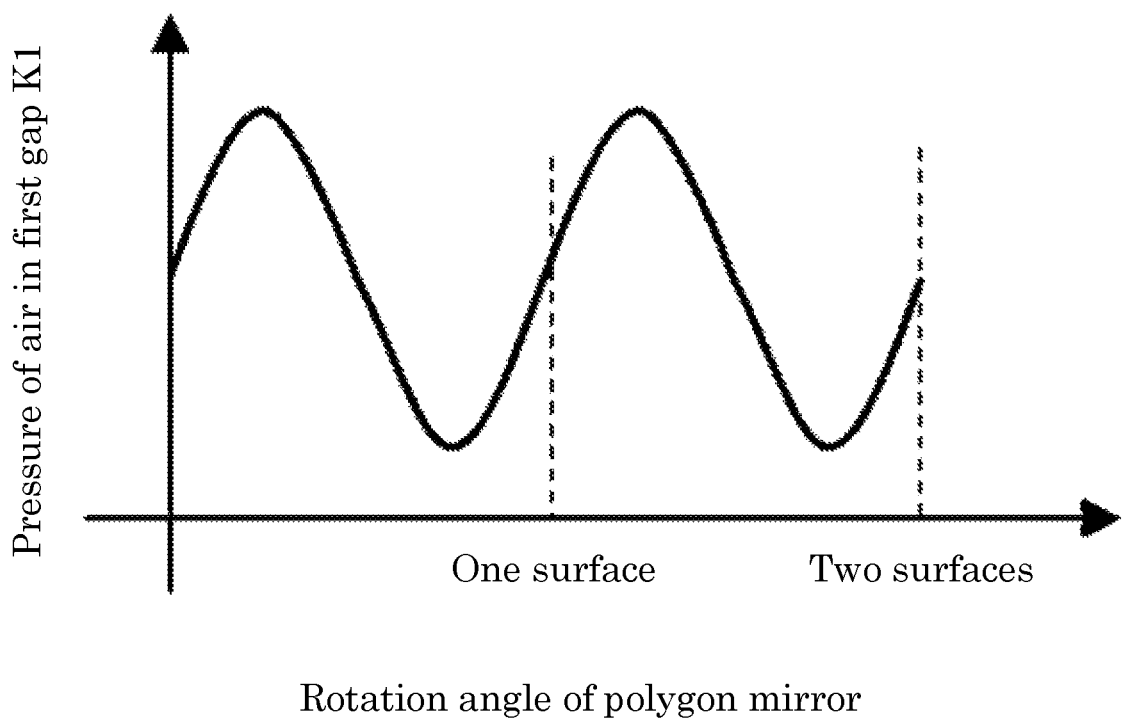
FIG. 13 is a view illustrating a variation in air pressure (first pressure) between a deflection surface of a polygon mirror and a first opening end of a first opening (a first gap K1).
Figure 14:
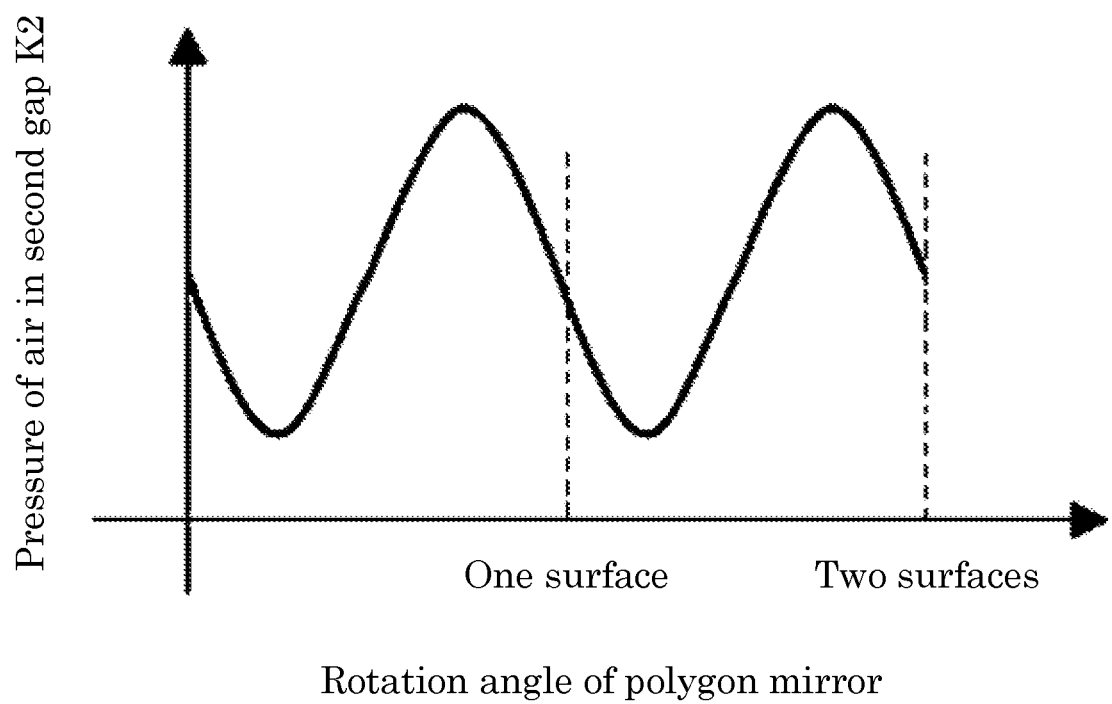
FIG. 14 is a view illustrating a variation in air pressure (second pressure) between a deflection surface of a polygon mirror and a second opening end of a first opening (a second gap K2).

Accordingly, first pressure of the air (air in the first gap K1) between the deflection surface 631 of the polygon mirror 63 and the first opening end A of the first opening 651C varies periodically with the rotation of the polygon mirror 63 (see FIG. 13). Furthermore, second pressure of the air (air in the second gap K2) between the deflection surface 631 of the polygon mirror 63 and the second opening end B of the first opening 651C varies periodically with the rotation of the polygon mirror 63 (see FIG. 14). The first pressure and the second pressure vary by one cycle in the rotation of one surface of the polygon mirror 63 (60° rotation of the polygon mirror 63).

[Noise Prevention Structure of Light Deflecting Device 6]

First Embodiment of Noise Prevention Structure of Light Deflecting Device 6

Since the first opening 651C is formed in the peripheral wall 651B of the first cover part 651 that covers the polygon mirror 63, noise generated by the rotation of the polygon mirror 63 is leaked out of the first opening 651C to the outside of the first cover part 651. In this regard, in the present embodiment, the first opening 651C of the first cover part 651 is formed as follows, so that noise is reduced.

As illustrated in FIG. 11, when an opening angle of the first opening 651C centered on the axial center P of the polygon mirror 63 is θ and n is set as a natural number smaller than the number of surfaces of the polygon mirror 63, the first opening 651C is formed such that the opening angle θ satisfies the following Equation (3).

$$\theta \approx (360°/\text{the number of surfaces of the polygon mirror 63}) \times n \quad (3)$$

FIG. 11 is a sectional view of the peripheral wall 651B of the first cover part 651 when n is 1 (sectional view (main scanning sectional view) in a direction perpendicular to the axial center direction of the polygon mirror 63). Since the number of surfaces of the polygon mirror 63 is 6, θ≈60° according to Equation (1) below. In the present embodiment, n is set to 60°. When the opening angle θ of the first opening 651C is 60°, a noise level is reduced because of the following reason.

In the present embodiment,

[A] Since the first opening 651C is formed such that the opening angle θ satisfies Equation (1) below, when one of the six corners of the polygon mirror 63 is positioned near the first opening end A as illustrated in FIG. 11, another one corner is positioned near the second opening end B. Even when the center between a pair of adjacent corners of the polygon mirror 63 is positioned near the first opening end A, the center between another pair of adjacent corners thereof is positioned near the second opening end B similarly to the above.

[B] That is, the first gap K1 and the second gap K2 always have approximately the same length during the rotation of the polygon mirror 63, so that the first pressure and the second pressure have approximately the same magnitude (absolute value). On the other hand, since air in the first cover part 651 is blown out from the first gap K1 and air is suck into the first cover part 651 from the second gap K2, the phase of a pressure variation in the first pressure and the phase of a pressure variation in the second pressure are shifted by 180° (corresponding to 0.5 cycle) (see FIG. 13 and FIG. 14).

[C] In this way, the phase of sound generated in the air blowing port near the first gap K1 and the phase of sound generated in the air suction port near the second gap K2 are also shifted by 180°. As a consequence, these sounds are mutually canceled out and a noise level is reduced. Consequently, even when the non-sealed type first cover part 651 is used, it is possible to sufficiently reduce noise generated by the rotation of the polygon mirror 63.

Figure 12:
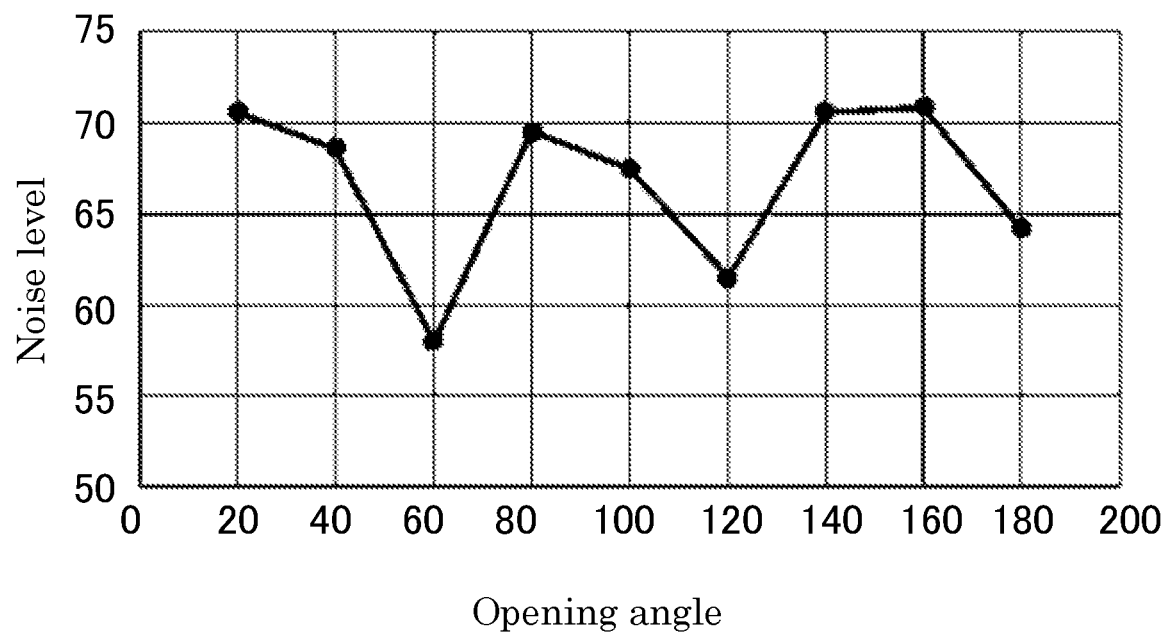
FIG. 12 is a view illustrating a relation between an opening angle of a first opening and a noise level.

When n is 2, θ is 120°, and when n is 3, θ is 180°. As described above, even when n is a natural number of 2, 3, . . . , which is smaller than the number of surfaces of the polygon mirror 63, it is possible to achieve the same effects as those of the aforementioned [A] to [C]. That is, when the first opening 651C is formed such that the opening angle θ satisfies Equation (3), it is possible to reduce the noise level. As illustrated in FIG. 12, it has been confirmed by experiments that the noise level is reduced when θ is 60°, 120°, and 180°.

Figure 15:
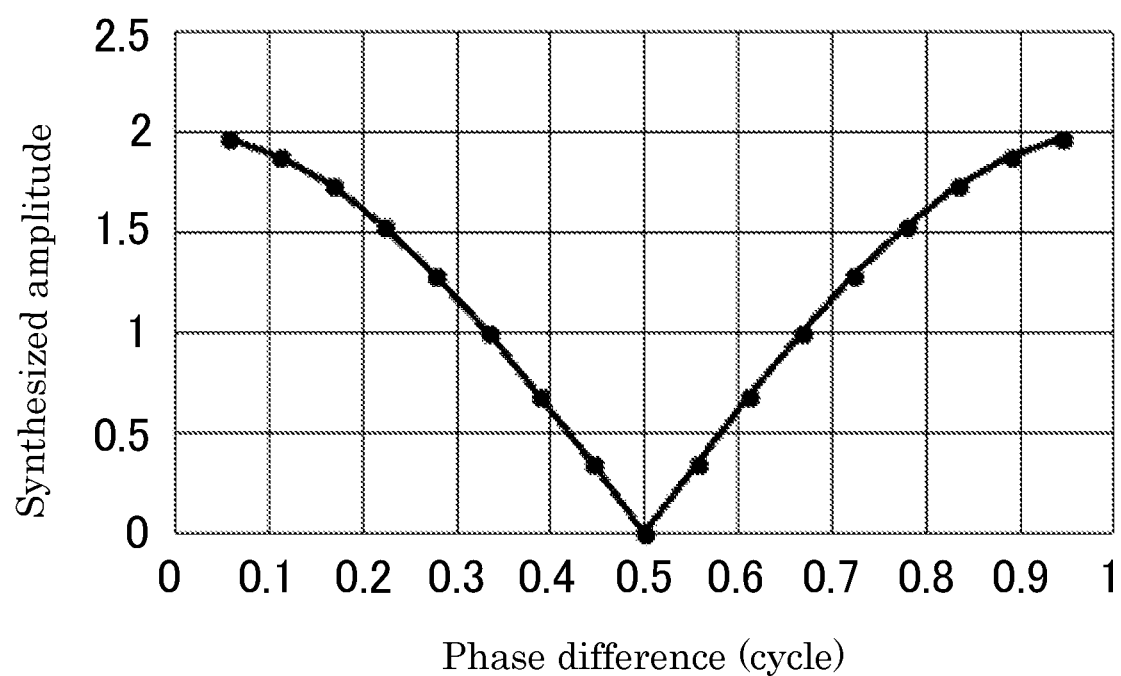
FIG. 15 is a view illustrating a relation between a synthesized amplitude and a phase difference (phase difference between a first waveform of a pressure variation in first pressure and a second waveform of a pressure variation in second pressure).

FIG. 15 illustrates a relation between a synthesized amplitude and a phase difference (phase difference between a first waveform of the pressure variation in the first pressure and a second waveform of the pressure variation in the second pressure). The synthesized amplitude is an amplitude of a waveform obtained by synthesizing the first waveform and the second waveform. The amplitude of the first waveform and the amplitude of the second waveform (amplitude of a basic waveform) are both 1.

As illustrated in FIG. 15, in a range in which the phase difference is (phase difference corresponding to 0.33 cycle) to (phase difference corresponding to 0.67 cycle), the synthesized amplitude is smaller than the amplitude 1 of the basic waveform. As in the present embodiment, since the synthesized amplitude is the smallest when the phase difference is a phase difference corresponding to 0.5 cycle, the noise level is smaller than those of noise generated by the first pressure and noise generated by the second pressure.

That is, in the present embodiment, the phase difference between the first waveform and the second waveform is set such that the amplitude of the waveform obtained by synthesizing the first waveform (see FIG. 13) of the pressure variation in the first pressure and the second waveform (see FIG. 14) of the pressure variation in the second pressure is smaller than any one of the amplitude of the first waveform and the amplitude of the second waveform. Furthermore, the opening angle θ of the first opening 651C is set as an angle (60° in the present embodiment) corresponding to the phase difference.

As illustrated in FIG. 3 and FIG. 11, when viewed in the axial center direction of the polygon mirror 63, if a distance between light beam C1 on the upstream side in the rotation direction of the polygon mirror 63 and the first opening end A of the first opening 651C is set as L1 and a distance between light beam C2 on the downstream side in the rotation direction of the polygon mirror 63 and the second opening end B of the first opening 651C is set as L2, the light deflecting device 6 is configured such that L1 and L2 satisfy the following Equation (4).

$$L1 < L2 \quad (4)$$

Figure 16:
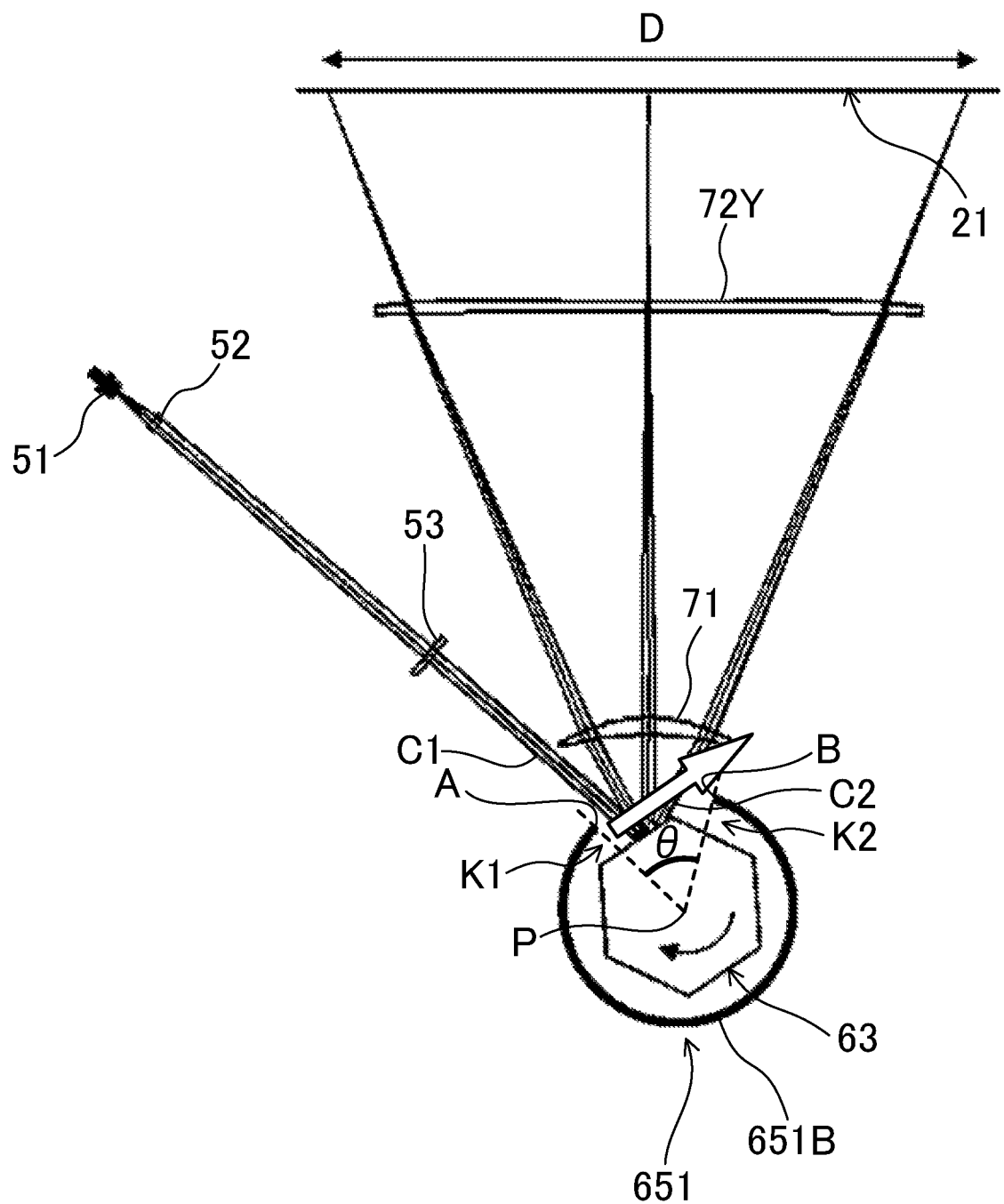
FIG. 16 is an optical path diagram illustrating a configuration of a main scanning section of an optical scanning device, which illustrates the flow of air generated by the rotation of a polygon mirror.

FIG. 16 illustrates that the flow of wind (flow of air blown out from the first gap K1) during the rotation of the polygon mirror 63 is indicated by a white arrow. For example, when L1>L2, since high-temperature wind in the vicinity of the polygon mirror 63 reaches the first scanning lens 71, optical performance is affected due to an increase in the temperature of the first scanning lens 71. On the other hand, when L1<L2, since the above wind (white arrow) is less likely to reach the first scanning lens 71. As a consequence, it is possible to reduce an increase in the temperature of the first scanning lens 71, so that it is possible to suppress the deterioration of the optical performance of the first scanning lens 71.

Second Embodiment of Noise Prevention Structure of Light Deflecting Device 6

Figure 17:
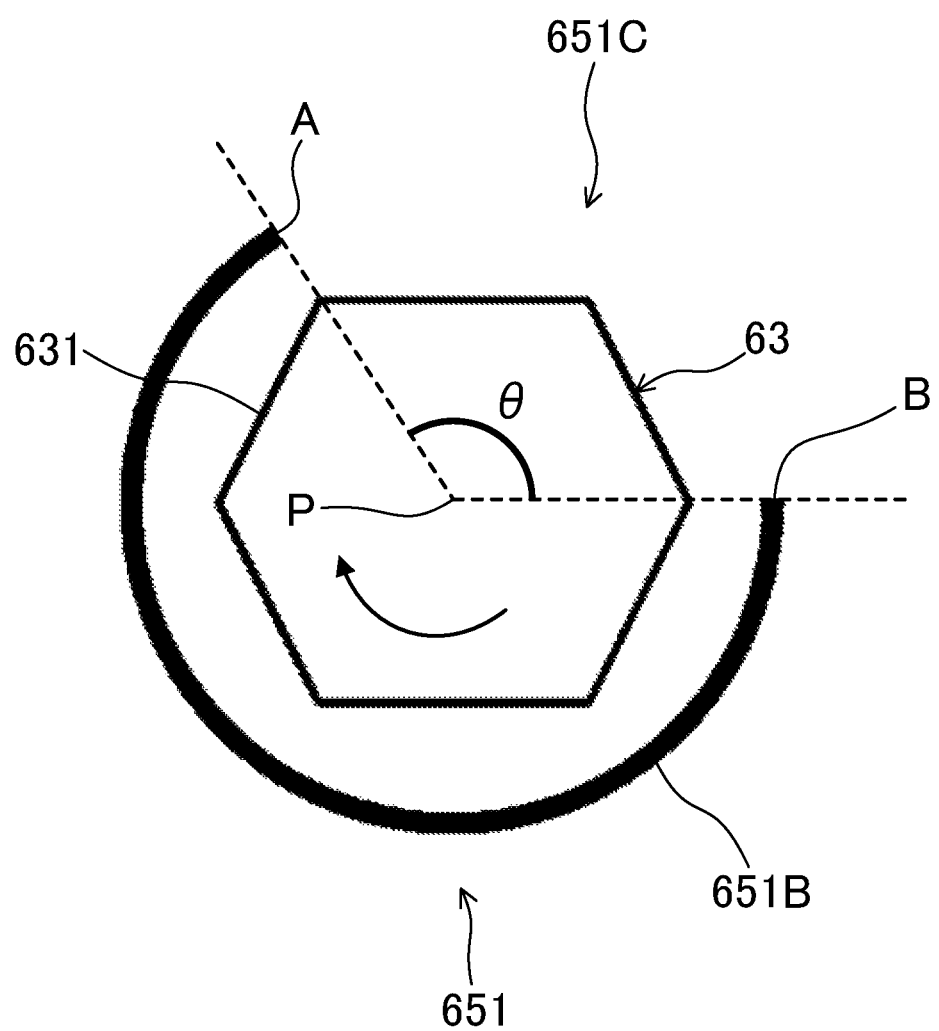
FIG. 17 is a view illustrating a section of a peripheral wall of a first cover part of a second embodiment and a polygon mirror.

FIG. 17 illustrates a sectional view of the peripheral wall 651B of the first cover part 651 when the polygon mirror has a regular hexagonal section and n is 2. Since the number of surfaces of the polygon mirror 63 is 6, θ is 120° according to Equation (3).

Even when θ is 120°, it is possible to achieve the same effects as those of the aforementioned [A] to [C]. That is, since the first opening 651C is formed such that the opening angle θ satisfies Equation (3), it is possible to reduce the noise level. As described above, it has been confirmed by experiments that the noise level is reduced when θ is 120° (see FIG. 12).

Figure 18:
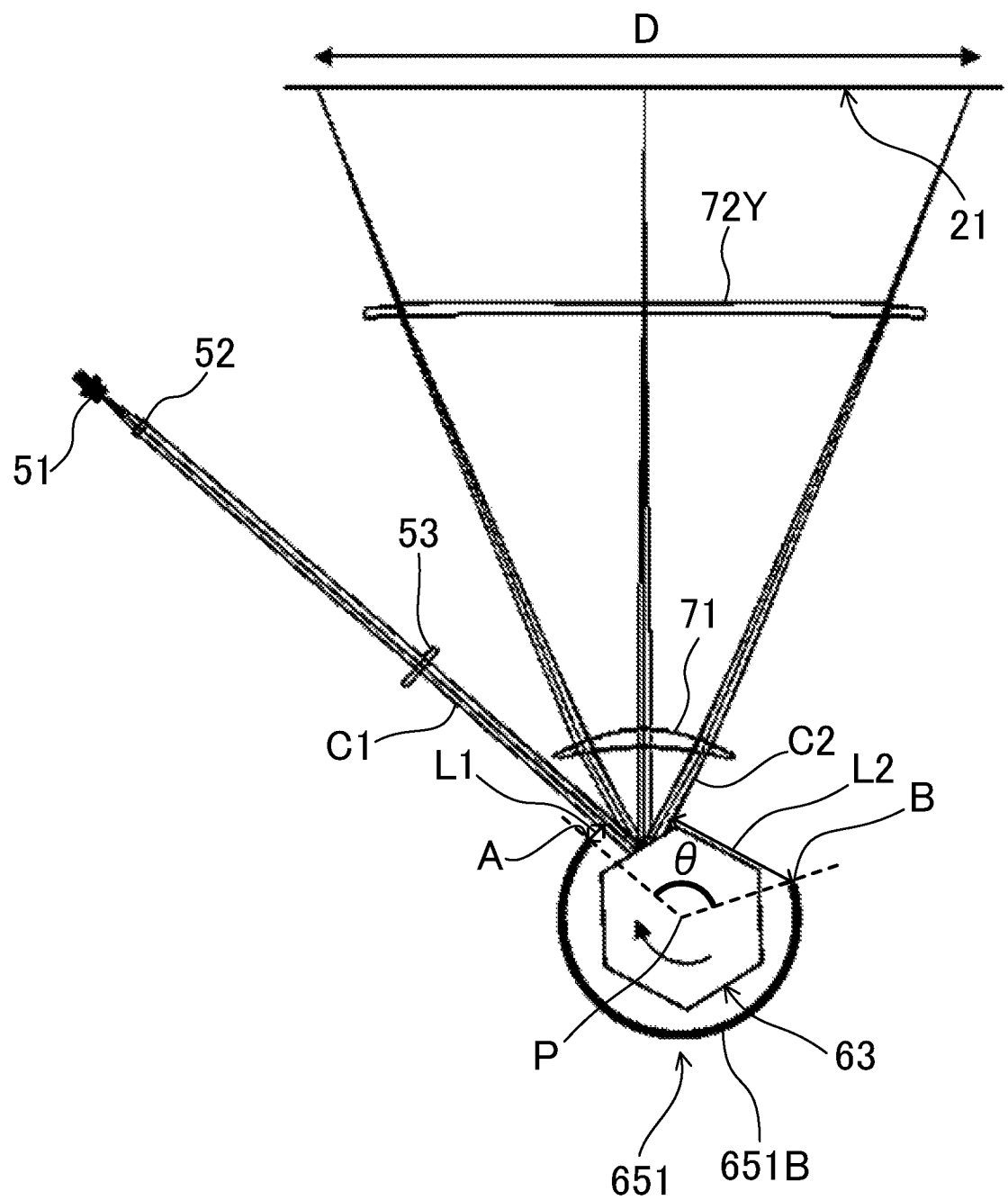
FIG. 18 is an optical path diagram illustrating a configuration of a main scanning section of an optical scanning device of a second embodiment.
Figure 19:
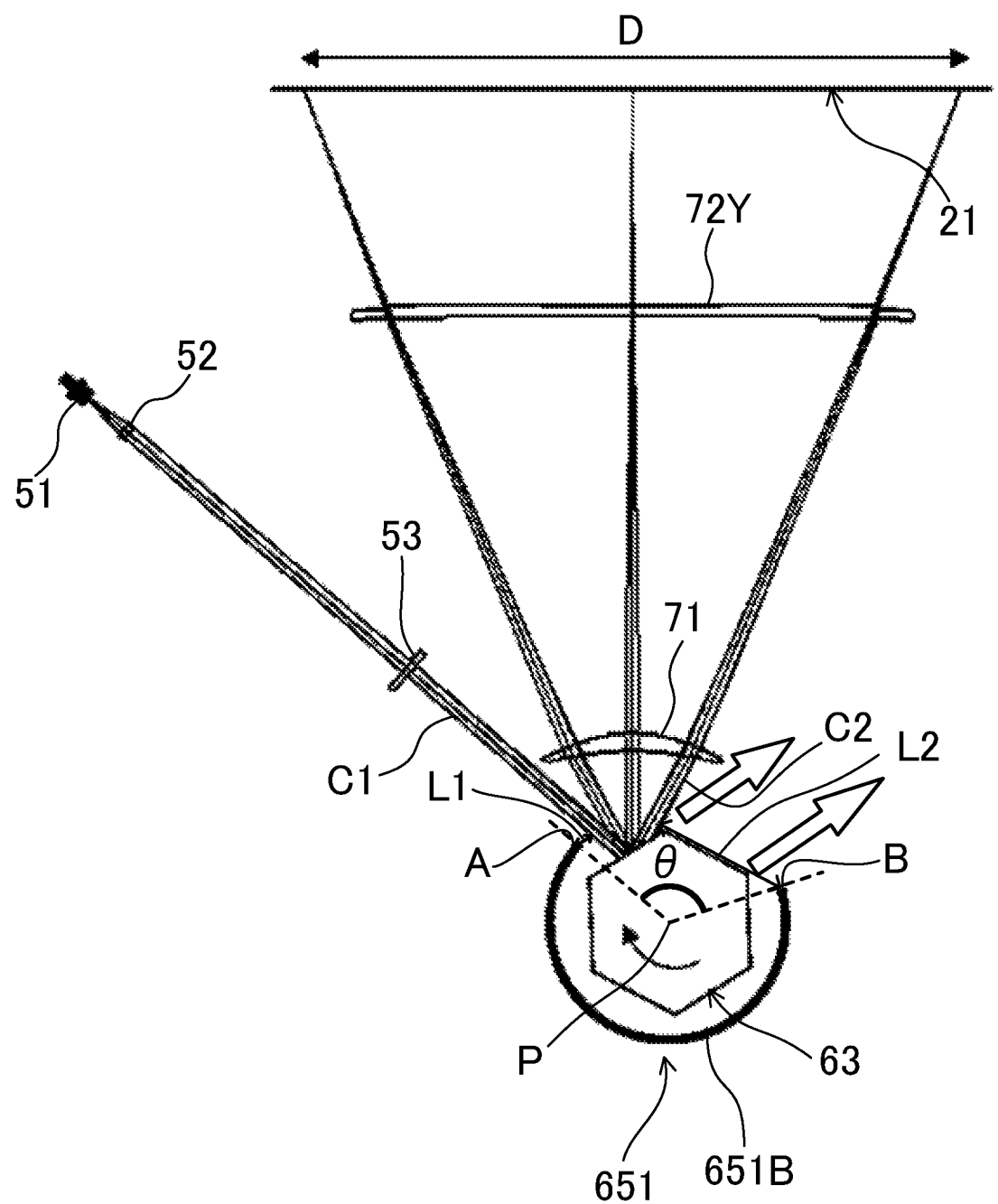
FIG. 19 is a view illustrating a second embodiment and is an optical path diagram illustrating a configuration of a main scanning section of an optical scanning device, which illustrates the flow of air generated by the rotation of a polygon mirror.
Figure 20:
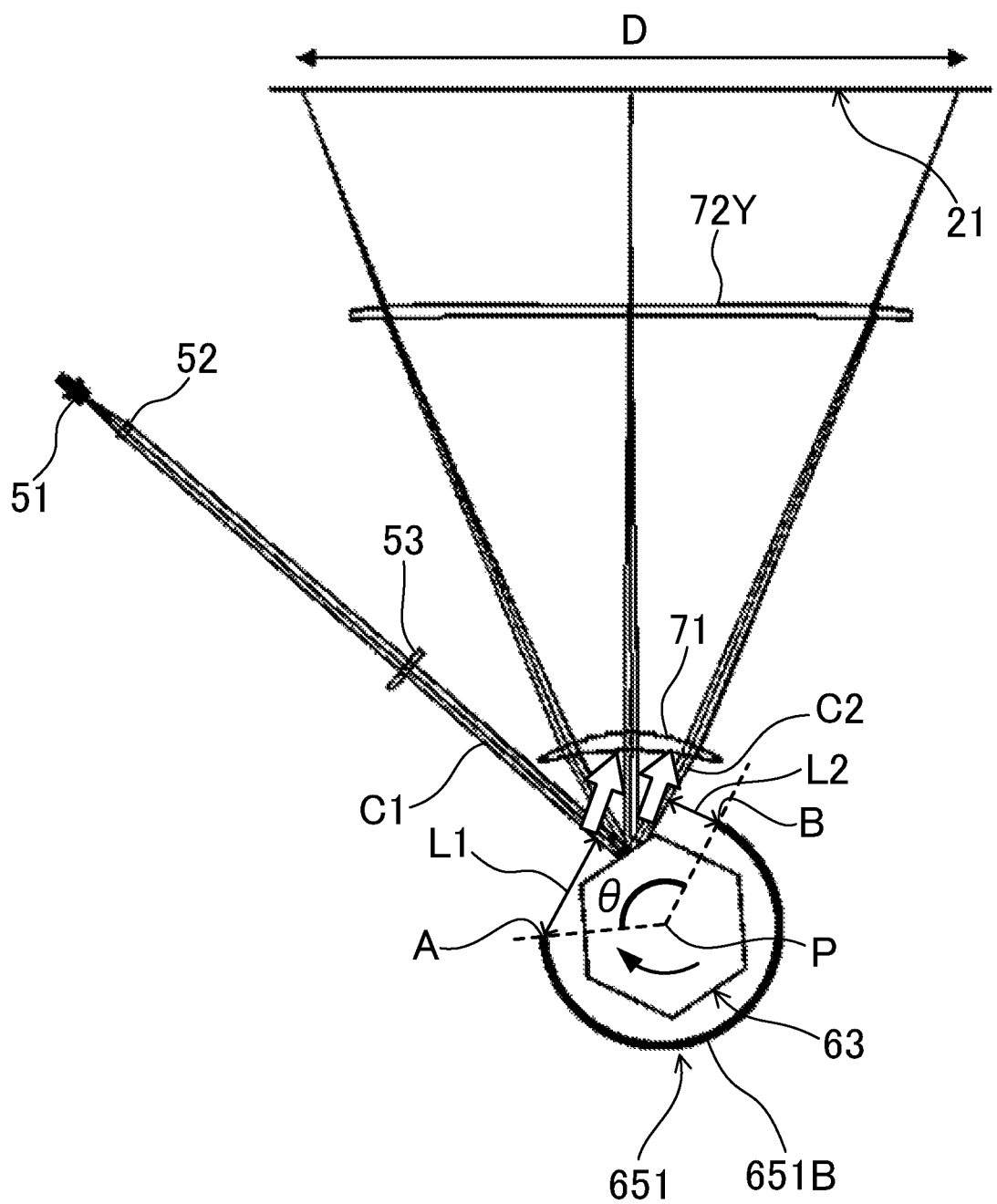
FIG. 20 is a view illustrating a comparative example of a second embodiment and is an optical path diagram illustrating a configuration of a main scanning section of an optical scanning device, which illustrates the flow of air generated by the rotation of a polygon mirror.

As illustrated in FIG. 18, also in the present second embodiment, L1<L2. As illustrated in FIG. 20, for example, when L1>L2, since high-temperature wind (white arrows) in the vicinity of the polygon mirror 63 reaches the first scanning lens 71, optical performance is affected due to an increase in the temperature of the first scanning lens 71. On the other hand, when L1<L2, since the above wind (white arrow) is less likely to reach the first scanning lens 71 as illustrated in FIG. 19, it is possible to reduce an increase in the temperature of the first scanning lens 71, so that it is possible to suppress the deterioration of the optical performance of the first scanning lens 71.

Third Embodiment of Noise Prevention Structure of Light Deflecting Device 6

Figure 21:
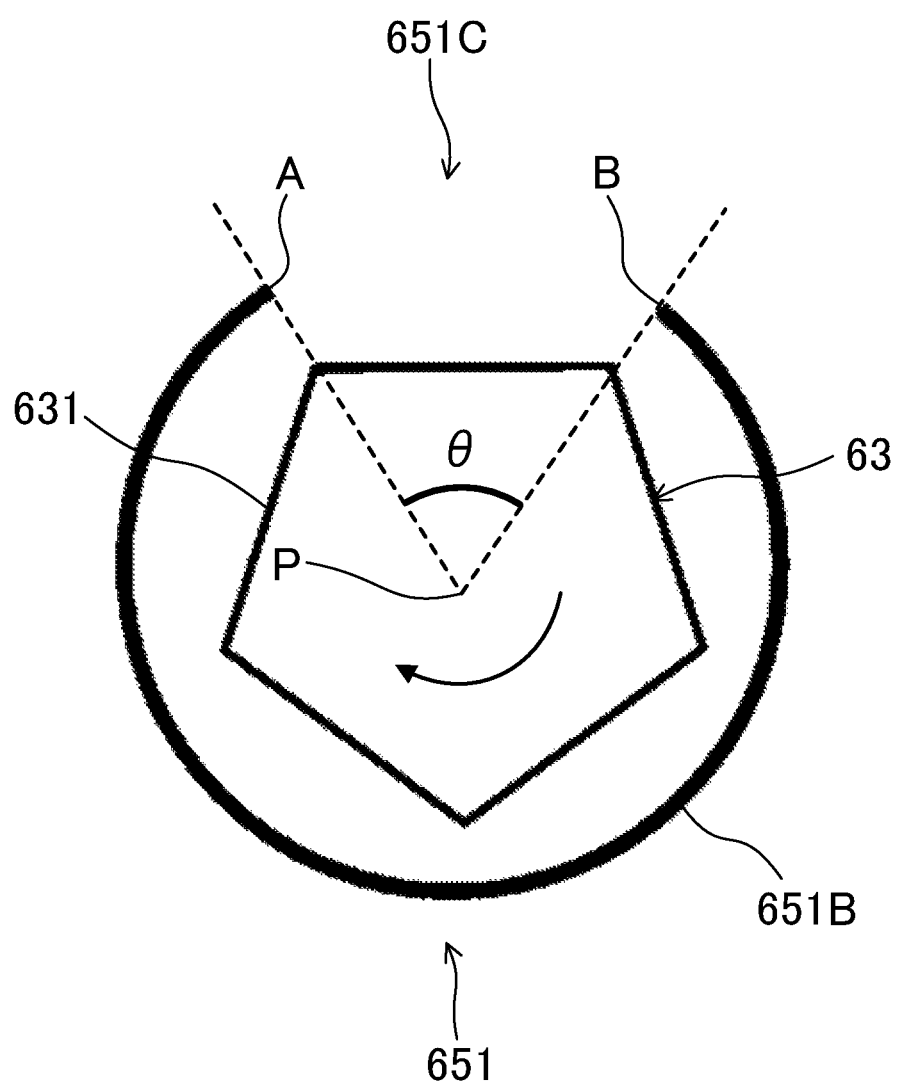
FIG. 21 is a view illustrating a third embodiment and is a view illustrating a section of a peripheral wall of a first cover part and a polygon mirror.

FIG. 21 illustrates a sectional view of the peripheral wall 651B of the first cover part 651 when the polygon mirror 63 has a regular pentagonal section and n is 1. Since the number of surfaces of the polygon mirror 63 is 5, θ is 72° according to Equation (3).

When the opening angle θ of the first opening 651C is 72°,

[A1] Since the first opening 651C is formed such that the opening angle θ satisfies Equation (3), when one of the five corners of the polygon mirror 63 is positioned near the first opening end A, another one corner is positioned near the second opening end B. Even when the center between a pair of adjacent corners of the polygon mirror 63 is positioned near the first opening end A, the center between another pair of adjacent corners thereof is positioned near the second opening end B similarly to the above.

Consequently, it is possible to achieve the same effects as those of the aforementioned [B] and [C].

Fourth Embodiment of Noise Prevention Structure of Light Deflecting Device 6

Figure 22:
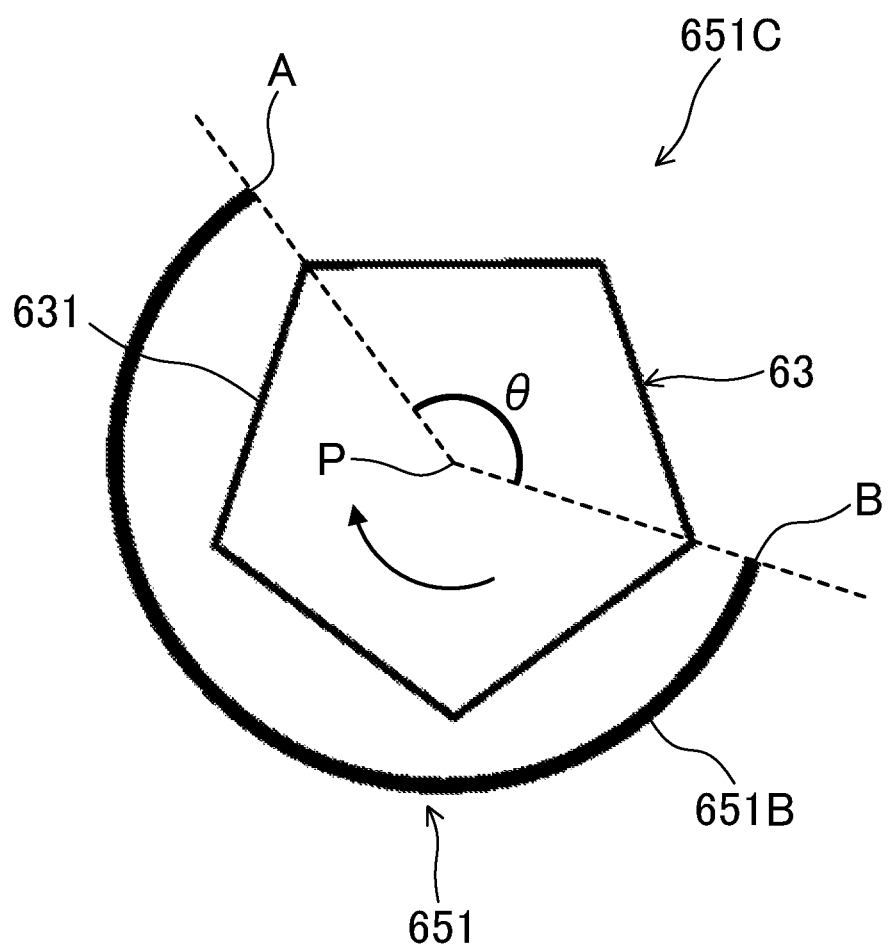
FIG. 22 is a view illustrating a fourth embodiment and is a view illustrating a section of a peripheral wall of a first cover part and a polygon mirror.

FIG. 22 illustrates a sectional view of the peripheral wall 651B of the first cover part 651 when the polygon mirror 63 has a regular pentagonal section and n is 2. Since the number of surfaces of the polygon mirror 63 is 5, θ is 144° according to Equation (1). When the opening angle θ of the first opening 651C is 144°, it is possible to achieve the same effects as those of the aforementioned [A1], [B], and [C].

Fifth Embodiment of Noise Prevention Structure of Light Deflecting Device 6

When the opening angle of the first opening 651C centered on the axial center P of the polygon mirror 63 is θ and n is set as a natural number smaller than the number of surfaces of the polygon mirror 63, the first opening 651C may also be formed such that the opening angle θ satisfies Equations (1) and (2) below.

$$\theta > ((360°/\text{the number of surfaces of rotary polyhedron}) \times n) \times 0.83 \quad (1)$$

$$\theta < ((360°/\text{the number of surfaces of rotary polyhedron}) \times n) \times 1.17 \quad (2)$$

When n is 1, 49.8°<θ<70.2° according to Equations (1) and (2) (the number of surfaces of the polygon mirror 63 is 6).

When 49.8°<θ<70.2°, the noise level is reduced. The reason will be described.

Equations (1) and (2) indicate that the opening angle θ of the first opening 651C is within +/−17% of the opening angle θ of the first opening 651C in the first embodiment. This indicates that the phase difference between the first waveform of the pressure variation in the first pressure and the second waveform of the pressure variation in the second pressure in the present fifth embodiment increases/decreases by +/−0.17 cycle with respect to the phase difference in the first embodiment. In the first embodiment, there is the phase difference corresponding to 0.5 cycle. Therefore, in the range of 49.8°<θ<70.2°, a phase difference corresponding to 0.33 cycle to 0.67 cycle occurs in both waveforms.

As illustrated in FIG. 15, in the range in which the phase difference is (phase difference corresponding to 0.33 cycle) to (phase difference corresponding to 0.67 cycle), since the synthesized amplitude is smaller than the amplitude 1 of the basic waveform, the noise level is smaller than those of the noise generated by the first pressure and the noise generated by the second pressure. As described above, according to the present fifth embodiment, even when the non-sealed type first cover part 651 is used, it is possible to sufficiently reduce the noise generated by the rotation of the polygon mirror 63.

What is claimed is:

1. A light deflecting device comprising:
a rotary polyhedron; and
a cover that covers the rotary polyhedron,
wherein the cover includes:
an opening facing a peripheral surface of the rotary polyhedron,
a light beam emitted from a light source is irradiated to the peripheral surface of the rotary polyhedron through the opening of the cover,
the rotary polyhedron is configured to allow the light beam to be deflected and scanned with respect to an object to be irradiated through the opening while rotating about an axial center thereof, and
when an opening angle of the opening centered on the axial center of the rotary polyhedron is θ and n is set as a natural number smaller than a number of surfaces of the rotary polyhedron, θ satisfies Equations (1) and (2) below, $$\theta > ((360°/\text{the number of surfaces of the rotary polyhedron}) \times n) \times 0.83 \quad (1)$$

$$\theta < ((360°/\text{the number of surfaces of the rotary polyhedron}) \times n) \times 1.17 \quad (2).$$

2. The light deflecting device according to claim 1, wherein, when viewed in an axial center direction of the rotary polyhedron, if a distance between the light beam incident on an upstream side in a rotation direction of the rotary polyhedron and an opening end of the opening of the cover on the upstream side in the rotation direction of the rotary polyhedron is set as L1 and a distance between the light beam deflected at a downstream side in the rotation direction of the rotary polyhedron and an opening end of the opening of the cover on the downstream side in the rotation direction of the rotary polyhedron is set as L2, Equation (4) below is satisfied, $$L1 < L2 \quad (4).$$

3. The light deflecting device according to claim 1, wherein a cover part that covers a driving unit of the rotary polyhedron is connected to the cover, and
the cover part is formed with air vent ports.

4. An optical scanning device comprising the light deflecting device of claim 1 and the light source.

5. An image forming apparatus comprising the optical scanning device of claim 4 and the object to be irradiated, wherein the object to be irradiated is an image carrying member having a surface on which an electrostatic latent image is formed.

6. The light deflecting device according to claim 1, wherein:

the number of surfaces of the rotary polyhedron is 5 or 6; and the natural number n is 2 or greater.

7. The light deflecting device according to claim 6, wherein the opening angle θ of the opening is equal to or less than 180°.

8. The light deflecting device according to claim 6, wherein, when viewed in an axial center direction of the rotary polyhedron, if a distance between the light beam incident on an upstream side in a rotation direction of the rotary polyhedron and an opening end of the opening of the cover on the upstream side in the rotation direction of the rotary polyhedron is set as L1 and a distance between the light beam deflected at a downstream side in the rotation direction of the rotary polyhedron and an opening end of the opening of the cover on the downstream side in the rotation direction of the rotary polyhedron is set as L2, Equation (4) below is satisfied, $$L1<L2 \tag{4}$$

9. The light deflecting device according to claim 6, wherein:

the cover has a disc-shaped top wall and a cylindrical peripheral wall; and the cylindrical peripheral wall has the opening formed in a peripheral surface thereof and is arranged concentrically with the rotary polyhedron.

10. A light deflecting device comprising:

a rotary polyhedron; and a cover that covers the rotary polyhedron, wherein the cover includes:

an opening facing a peripheral surface of the rotary polyhedron, a light beam emitted from a light source is irradiated to the peripheral surface of the rotary polyhedron through the opening of the cover, the rotary polyhedron is configured to allow the light beam to be deflected and scanned with respect to an object to be irradiated through the opening while rotating about an axial center thereof, and when an opening angle of the opening centered on the axial center of the rotary polyhedron is θ and n is set as a natural number smaller than a number of surfaces of the rotary polyhedron, θ satisfies Equation (3) below, $$\theta \approx (360°/\text{the number of surfaces of the rotary polyhedron}) \times n \tag{3}$$

11. The light deflecting device according to claim 10, wherein, when viewed in an axial center direction of the rotary polyhedron, if a distance between the light beam incident on an upstream side in a rotation direction of the rotary polyhedron and an opening end of the opening of the cover on the upstream side in the rotation direction of the rotary polyhedron is set as L1 and a distance between the light beam deflected at a downstream side in the rotation direction of the rotary polyhedron and an opening end of the opening of the cover on the downstream side in the rotation direction of the rotary polyhedron is set as L2, Equation (4) below is satisfied, $$L1<L2 \tag{4}$$

12. The light deflecting device according to claim 10, wherein a cover part that covers a driving unit of the rotary polyhedron is connected to the cover, and the cover part is formed with air vent ports.

13. An optical scanning device comprising the light deflecting device of claim 10 and the light source.

14. An image forming apparatus comprising the optical scanning device of claim 13 and the object to be irradiated, wherein the object to be irradiated is an image carrying member having a surface on which an electrostatic latent image is formed.

15. The light deflecting device according to claim 10, wherein:

the number of surfaces of the rotary polyhedron is 5 or 6; and the natural number n is 2 or greater.

16. The light deflecting device according to claim 15, wherein the opening angle θ of the opening is equal to or less than 180°.

17. The light deflecting device according to claim 15, wherein, when viewed in an axial center direction of the rotary polyhedron, if a distance between the light beam incident on an upstream side in a rotation direction of the rotary polyhedron and an opening end of the opening of the cover on the upstream side in the rotation direction of the rotary polyhedron is set as L1 and a distance between the light beam deflected at a downstream side in the rotation direction of the rotary polyhedron and an opening end of the opening of the cover on the downstream side in the rotation direction of the rotary polyhedron is set as L2, Equation (4) below is satisfied, $$L1<L2 \tag{4}$$

18. The light deflecting device according to claim 15, wherein:

the cover has a disc-shaped top wall and a cylindrical peripheral wall; and the cylindrical peripheral wall has the opening formed in a peripheral surface thereof and is arranged concentrically with the rotary polyhedron.

\* \* \* \* \*